United States Patent [19]

Gooch et al.

[11] Patent Number: 5,402,294
[45] Date of Patent: Mar. 28, 1995

[54] LAMINATED, HIGH FREQUENCY, MAGNETIC TRANSDUCER AND MANUFACTURING METHOD THEREFOR

[75] Inventors: Beverley R. Gooch, Sunnyvale; George R. Varian, Palo Alto, both of Calif.

[73] Assignee: Ampex Systems Corporation, Redwood City, Calif.

[21] Appl. No.: 122,109

[22] Filed: Sep. 16, 1993

Related U.S. Application Data

[62] Division of Ser. No. 845,894, Mar. 4, 1992, Pat. No. 5,267,392.

[51] Int. Cl.⁶ .................... G11B 5/42; G11B 5/127; G11B 5/147
[52] U.S. Cl. .................... 360/125; 360/126; 29/603
[58] Field of Search .............. 336/178, 192, 198, 212; 360/125, 126, 121; 29/603

[56] References Cited

U.S. PATENT DOCUMENTS

| | | |
|---|---|---|
| 3,140,361 | 7/1964 | Eldridge . |
| 3,549,822 | 12/1970 | Chupity . |
| 3,651,278 | 3/1972 | Chupity et al. . |
| 4,219,853 | 8/1980 | Albert et al. . |
| 4,242,711 | 12/1980 | Sata et al. . |
| 4,404,608 | 9/1983 | Yasuda et al. . |
| 4,635,153 | 1/1987 | Shimamura et al. . |
| 4,639,811 | 1/1987 | Diepers et al. . |
| 4,710,838 | 12/1987 | Jahnke . |
| 4,716,484 | 12/1987 | Kaminaka et al. . |
| 4,780,779 | 10/1988 | Pisharody et al. . |
| 4,782,416 | 11/1988 | Hillenbrand et al. . |
| 4,811,146 | 3/1989 | Niwa . |
| 4,819,112 | 4/1989 | Iwata et al. .............. 360/126 |
| 4,819,113 | 4/1989 | Kubota et al. . |
| 4,837,924 | 6/1989 | Lazzari . |
| 4,839,763 | 6/1989 | Matsuzawa . |
| 4,868,698 | 9/1989 | Takahashi et al. . |
| 4,873,599 | 10/1989 | Sueoka . |
| 4,888,658 | 12/1989 | Oneo et al. . |
| 4,901,179 | 2/1990 | Satomi et al. . |

FOREIGN PATENT DOCUMENTS

| | | | |
|---|---|---|---|
| 3730614 | 3/1988 | Germany | 360/125 |
| 148718 | 11/1981 | Japan | 360/125 |
| 301007 | 12/1990 | Japan | 360/125 |

OTHER PUBLICATIONS

The Complete Handbook of Magnetic Recording 3rd Edition, Finn Jorgensen, 1988, pp. 204–thru 208.
Magnetic Recording, vol. 1 Technology, 1987, C. Denis Mee, Eric D. Daniel, pp. 315 thru 325.

*Primary Examiner*—John H. Wolff
*Assistant Examiner*—Allen Cao
*Attorney, Agent, or Firm*—John G. Mesaros; Ralph L. Mossino; George B. Almeida

[57] ABSTRACT

A magnetic transducer for reproducing/recording high frequency signals with a magnetic tape medium includes a pair of opposed transducer head halves separated by an insulation gap and bonded together to form a Y-shaped pole structure, each half including a laminated at least partially ferromagnetic core portion bounded on opposite surfaces with outer and inner conductive layers, each of which forms a winding coil portion. Each core section has a leg portion and an angularly disposed arm portion, the distal end of which is capped with a block-shaped ferromagnetic pole tip in magnetic path relation therewith, the two pole tips lying in a common plane transverse to the plane of the gap. The conductive layers, when conductively interconnected, such as by jumpers, form a one or two turn coil for the transducer. The inner conductor is of an inverted generally U-shaped configuration with the bight portion of the two inner conductors passing through, and substantially filling, the openings of the Y-shape on opposite sides of the insulation gap layer beneath the pole pieces. The method of fabricating the magnetic transducer generally comprises the steps of forming at least two generally identical transducer head halves, each having generally one half of a Y-shape, commencing with providing a substrate having a surface shaped to define the core configuration and having a band shaped to define the pole configurations; applying a conductive layer to the surface for providing an (Abstract continued on next page.)

ABSTRACT outer coil conductor; alternately applying laminated of insulating and magnetic material to form a laminated core section; applying a conductive layer over an insulation layer about the face and side edges of the laminated core section for providing an inner generally U-shaped coil conductor; forming, in the band, a pole piece of magnetic material at the distal end of the arm of the core section; bonding two such transducer head halves in facing relation to form a Y-shaped transducer with the bonding material being insulating and forming the gap between the two pole pieces.

14 Claims, 18 Drawing Sheets

LAMINATED, HIGH FREQUENCY, MAGNETIC TRANSDUCER AND MANUFACTURING METHOD THEREFOR

This is a divisional of application Ser. No. 07/845,894, filed on Mar. 4, 1992, U.S. Pat. No. 5,267,392.

CROSS-REFERENCE TO RELATED APPLICATION

The subject matter of this invention is related to the subject matter of a patent application filed concurrently herewith, entitled "Small Core Metal Head Transducer and Manufacturing Method Therefor" by Beverley R. Gooch, such application being assigned to the assignee of the present invention.

BACKGROUND OF THE INVENTION

This invention relates generally to magnetic head transducers and more particularly to a laminated, high frequency, magnetic transducer for a head for use with a magnetic tape media, plus a method for producing such a transducer.

The performance of a magnetic tape recorder depends heavily on the properties of the magnetic materials used to make the recording heads and tapes and on the structural configuration of these materials which influence their magnetic properties. Magnetically hard materials, characterized by their high remanence, high coercivity, and low permeability, are chiefly used in the manufacturing of the recording tape and other related recording media. On the other hand, magnetically soft materials, which exhibit low coercivity, low remanence, and relatively high permeability, are commonly utilized to make the magnetic cores for the heads which are the means by which electrical signals are recorded on and reproduced from the magnetic tape.

For a video recorder, the typical ring-type magnetic video head is composed of two highly permeable magnetic cores, with a nonmagnetic gap spacer and a coil to which signal information is connected. The record video head is a transducer that changes the electrical energy from the signal system into a magnetic field that is emitted from a physical gap in the video head which impresses a magnetic pattern on the magnetic tape proportional to the electrical signal. The reproduce video head, conversely, is a transducer that collects the flux from the magnetic tape across a physical gap and changes it into an electrical signal that is proportional to the recorded flux.

Ferrite materials have been conventionally used as the magnetic material in video heads. The advent of high-definition video tape recorders, digital video tape recorders, and the like, with the resultant use of high coercivity recording media such as metal powder media, metal evaporated media etc., have accelerated the trend towards high density construction for recording even larger amounts of information. As part of this evolution, there is the resultant need to increase the frequency of the information signal recorded on the medium. Conventional ferrite cores are simply incapable of providing the desired characteristics to achieve the required performance for these applications. Due to its inherent brittleness, ferrite cores cannot be made into narrow track widths or thin magnetic core laminations since the consequent chipping and breaking of the ferrite material during the fabrication process cannot be eliminated.

In addition to the fabrication problems associated with ferrite heads, there are performance problems, particularly when such heads are used with high coercivity magnetic tape, and particularly during the recording process. During recording, larger signals are required with high coercivity magnetic tapes than with conventional magnetic tapes. The problem is not severe with the use of ferrite heads during reproduce operations, since signal levels from the tape are much lower in magnitude. With higher recording signals and smaller heads, the signal tends to drive the ferrite heads into saturation. On reproduce or "playback", it has also been observed that there is a significant noise level resulting from contact of such high coercivity magnetic tapes with the ferrite heads, which, in turn, requires more signal to achieve an acceptable signal to noise ratio. Bulk metal heads likewise have performance disadvantages, one of the more significant disadvantages being that they have poor high frequency response, principally because of eddy current losses.

The above considerations have led to the use in recording heads of any number of other commercially available magnetic materials which have higher flux density saturation, such materials including cobalt-zirconium-niobium (CZN) alloys, iron-aluminum-silicon alloys including Alfesil, Sendust, Spinalloy, or Vacodur each having a nominal composition of 85% iron, 6% aluminum, and 9% silicon, and also amorphous metals.

Besides the magnetic properties of the head core materials used, the critical design considerations that dictate performance of the video heads are track width, gap length, gap depth, core cross-sectional area, and other core geometry (e.g. path length). Each of these parameters must be selected in accordance with the design criteria of the magnetic tape recorder, while, at the same time, maintaining the head efficiency as high as possible.

There exists, therefore, a significant need for an improved high frequency magnetic transducer having a short magnetic path to reduce core reluctance and make the reduced core reluctance less dependent on the permeability of the magnetic material used in the magnetic cores. In addition, eddy current losses and other frequency effects should be minimized. Pole tip wear should also be minimized and leakage reluctance reduced. Ideally, such heads should provide good high frequency response and have characteristics such that the saturation of the core material does not occur at normal recording levels. The fabrication of such a transducer should be high volume, high accuracy, low cost and achieve a high degree of uniformity. The present invention fulfills these needs and provides further related advantages.

SUMMARY OF THE INVENTION

In accordance with the present invention, an improved magnetic transducer for reproducing and/or recording high frequency signals with a magnetic tape medium includes a pair of opposed transducer head halves separated by an insulation gap and bonded together. Each transducer head half includes a laminated, at least partially ferromagnetic core section, bounded on opposite surfaces with conductive layers, each of which forms a signal coil portion. Each core section is formed as one-half of a Y-shaped cross-sectional configuration having a leg portion and an angularly disposed arm portion. The two transducer head halves are positioned and bonded in leg portion abutting relation with the bonding material forming an insulation gap. Each distal end of the arm portions is provided with a block-shaped ferromagnetic pole piece in magnetic path relation with the laminated core portion and extending into the V-shaped portion intermediate the distal ends into abutting relation with the insulation gap, the two pole pieces lying in a common plane traverse to the plane the gap.

Each laminated core portion comprises a first insulation layer followed by a plurality of thin layers of alternating magnetic material and insulation material. The conductive layers on the outer and inner surfaces of the laminated core section form outer and inner conductors which, when conductively interconnected, such as by jumpers, are configured to form a one or two turn coil for the transducer. The inner conductor is of an inverted generally U-shaped configuration with the bight portion of the two inner conductors passing through, and substantially filling, the openings of the Y-shape on opposite sides of the insulation gap layer beneath the pole pieces. The leg portions of the inner conductor straddle the laminated core section. Both the inner and outer conductors are of a width greater than the width of the laminated core section so that, after slicing or dicing of the substrate block for formation of an individual transducer, the edges of the inner and outer conductors are accessible from the exterior for attachment of the jumpers for formation of the winding coils.

Preamplifier means may be affixed directly to the transducer and electrically connected to the ends of the coils thus formed thereby providing short leads from the transducer coil to the preamp, thus reducing the capacitance and inductance losses associated with long leads at high frequencies (e.g., 100 to 150 MHz).

The method of fabricating the magnetic transducer generally comprises the steps of forming at least two generally identical transducer head halves, each having generally one half of a Y-shape, commencing with providing a substrate having a surface shaped to define the core configuration and having a band shaped to define the pole configurations; applying a conductive layer to the surface for providing an outer coil conductor; alternately applying laminae of insulating and magnetic material to form a laminated core structure; removing selected portions of the laminated core structure to form the individual laminated core sections; applying an insulation layer about the face and side edges of the laminated core sections; applying a second or inner conductor layer over the insulation layer for providing an inner generally U-shaped coil conductor; forming, in the band, a pole piece of magnetic material at the distal end of the arm of the core section; bonding two such transducer head halves in facing relation to form a Y-shaped transducer, with the bonding material being insulating and forming the gap between the two pole pieces.

The entire transducer is fabricated by high volume production, extremely high accuracy, and low cost techniques such as material deposition and photolithographic processes. With batch fabrication, all of the magnetic core material for a large number of transducers is deposited during the same process step and all of the transducing gaps are formed at the same time. This results in a high degree of uniformity for all of the transducers.

Other features and advantages of the present invention will become apparent from the following detailed description, taken in conjunction with the accompanying drawings which illustrate, by way of example, the principles of the invention.

DETAILED DESCRIPTION OF THE PREFERRED EMBODIMENTS

Figure 1:
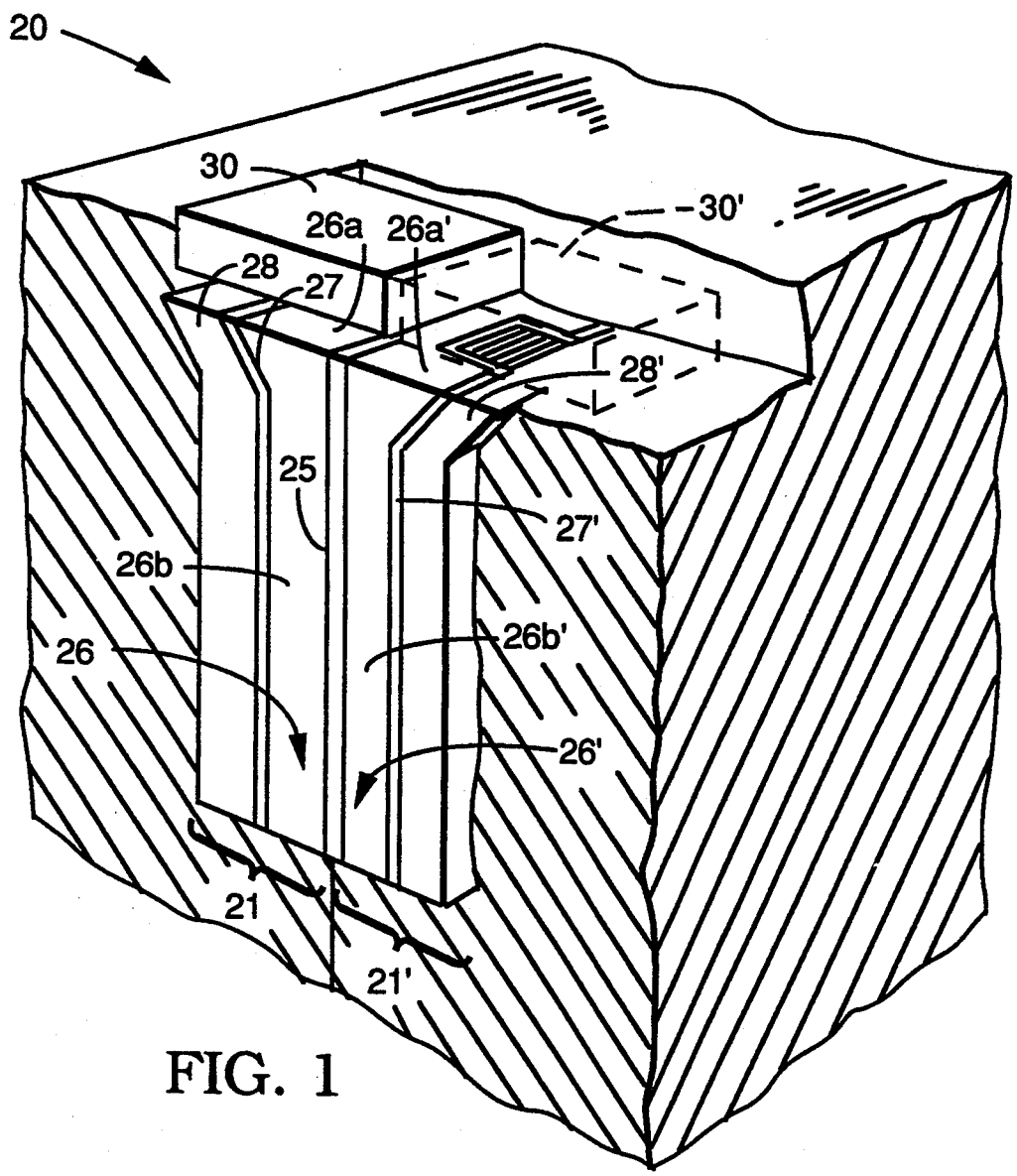
FIG. 1 is a diagrammatic perspective view of the high frequency magnetic transducer of the present invention.
Figure 2:
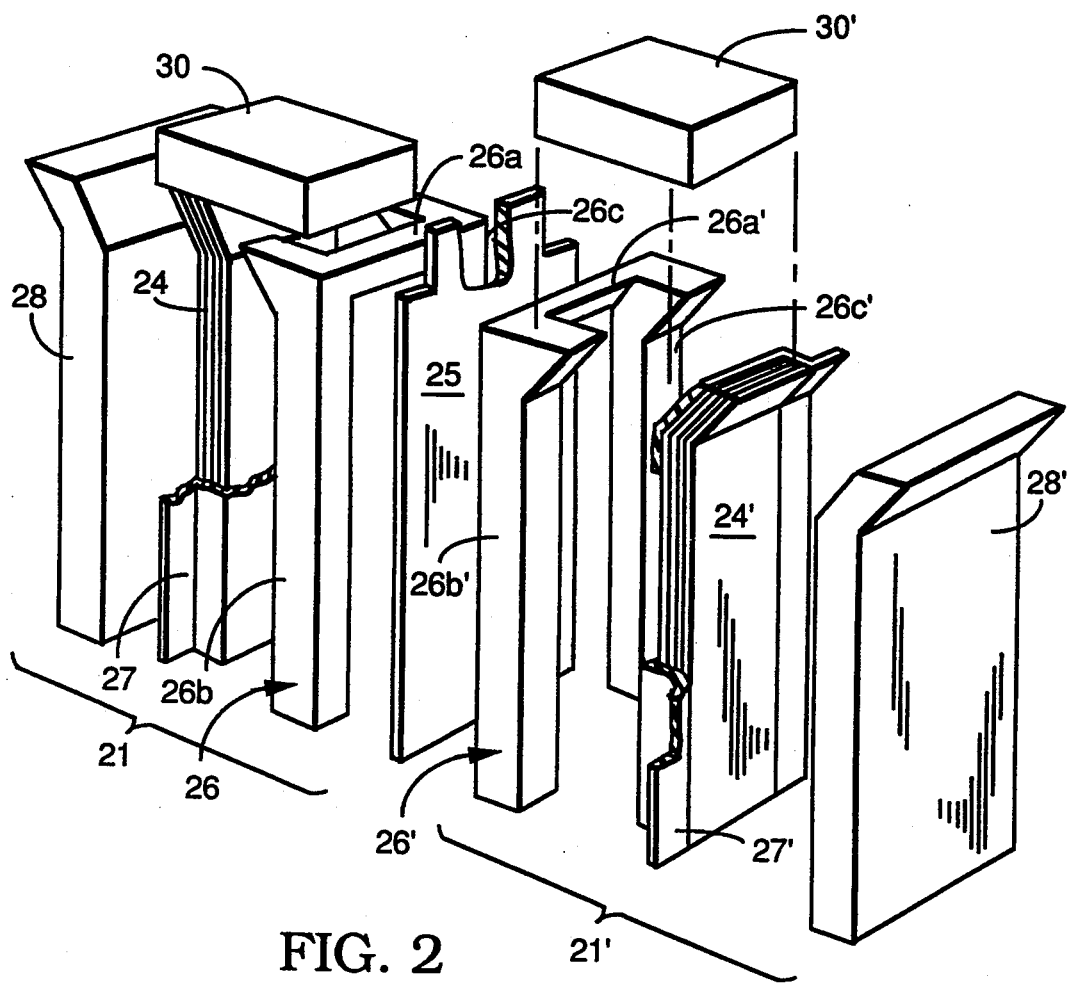
FIG. 2 is an exploded perspective view of the transducer of FIG. 1, with portions partially broken away, to diagrammatically depict the major elements thereof.

Referring now to the drawings, and particularly to FIGS. 1 and 2, there is shown a thin film magnetic transducer, generally designated 20, formed along with a second such transducer within a substrate 22, 22', material (FIGS. 3A–3L) fabricated, in the present instance, into two generally identical workpieces bonded together with an intervening insulation gap layer 25. The views of FIGS. 1 and 2 are diagrammatic, and not to scale, for ease of illustration and description. With the workpieces fabricated as will hereinafter be described, there is provided a transducer 20 including first and second head sections, generally designated 21, 21', formed of first and second laminated magnetic core sections, generally designated 24, 24'; a pair of inner generally U-shaped conductors 26, 26'; a pair of outer conductors 28, 28'; and a pair of pole tips 30, 30'. When fabricated as hereinafter described, the transducer 20 is provided with a generally Y-shaped cross-section, with the pole tips 30, 30' affixed at the distal ends of the arm portions of the Y-shaped core sections 24, 24' and extending in a direction orthogonal to the plane of the insulation gap layer 25, with the inner and outer conductors 26, 26' and 28, 28' being accessible from the exterior of the transducer for enabling connection of jumper wires for the purpose of forming a one or two turn coil as desired. As can be seen in FIG. 1, each laminated magnetic core section 24 is sandwiched between an inner layer or conductor 26 and an outer layer or conductor 28, the terms "inner" and "outer" being used relative to the plane of the insulation gap 25 on the axial centerline of the transducer 20. Although the insulation gap 25 is shown as a single element, as will be described, a portion of the insulation gap 25 is deposited on each of two like head sections, with the two layers, when adjoined and bonded, forming a single gap. The outer conductors 28, 28' are generally imperforate conductor layers of a bent plate-shaped configuration, while the inner conductors are generally U-shaped in configuration with the bight portions 26a, 26a', passing through the winding gap or window formed by the half-Y shape of the laminated core section 24. The legs 26b, 26c and 26b', 26c' of conductors 26, 26' straddle the side edges of the core sections 24, 24'. As will be hereafter described, each core section 24, 24' is provided with an insulation layer 27, 27', which covers the inner surface and lateral edges thereof.

Figure 3A:
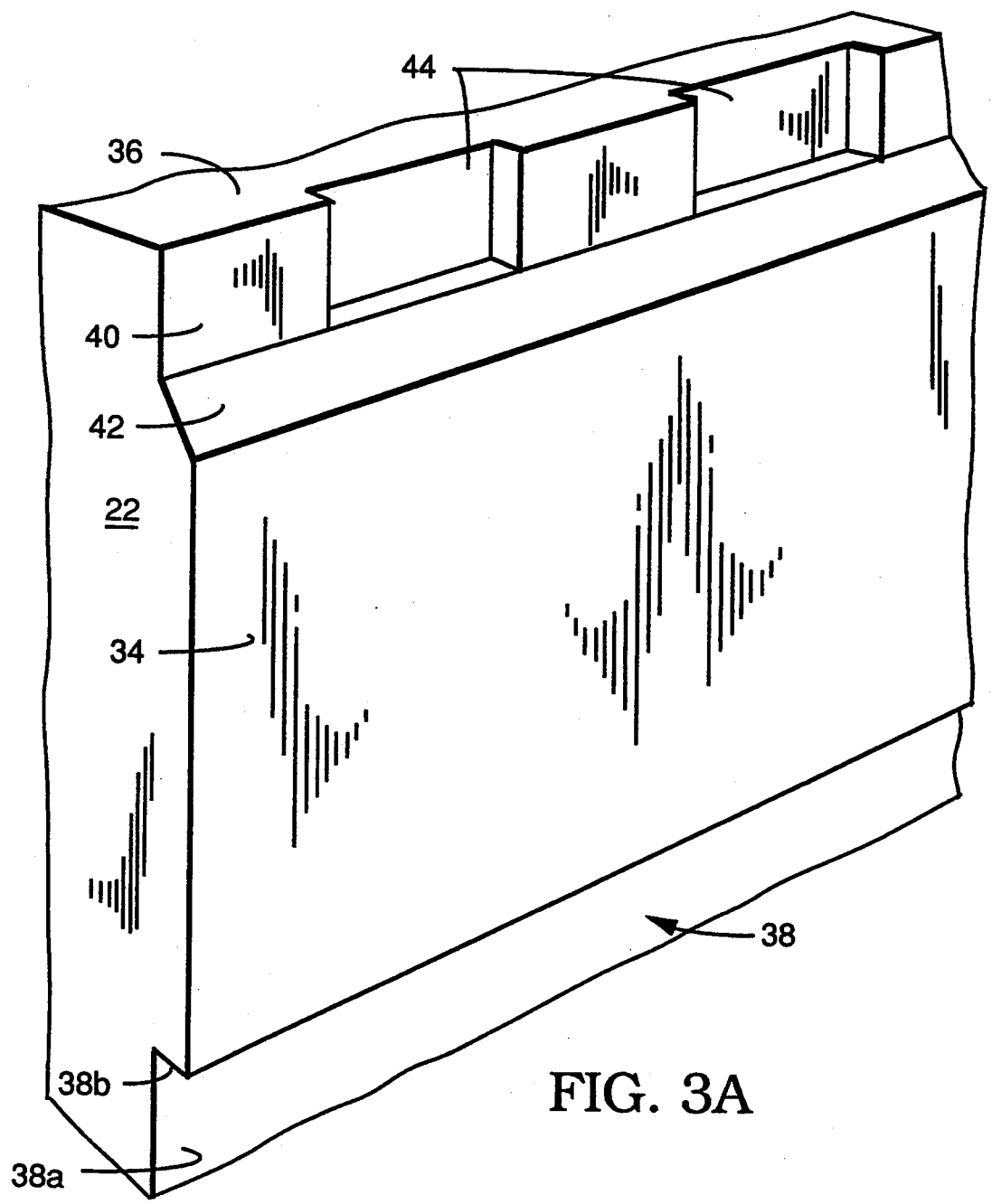
FIGS. 3A through 3M are schematic perspective views showing the sequential method steps utilized in the fabrication of the laminated, high frequency, magnetic transducer of FIG. 1.

Referring now to FIGS. 3A through 3M, the sequential method steps utilized in the fabrication of the laminated, high frequency, magnetic transducer 20 of the present invention will now be described, along with the materials utilized during the fabrication. Referring specifically to FIG. 3A, the starting point in the method is providing a generally elongate thin block substrate 22 of a suitable nonmagnetic, non-conducting material such as alumina ($Al_2O_3$), ceramics such as a mixture of titanium carbide (TiC) and alumina, or other comparable materials. The substrate 22, at the outset, has at least first and second mutually perpendicular surfaces 34 and 36. The substrate 22 has a thickness on the order of 0.030 inch and is shaped by conventional machining methods or by a reactive ion beam etching (RIBE) process. A bonding notch, generally designated 38, is formed in the lower (as viewed in the drawings) longitudinal edge of substrate 22, the notch 38 being generally right-angular and having a surface 38a generally parallel to the first surface 34 and a surface 38b perpendicular thereto.

At the upper longitudinal edge, that is, at the intersection of the two surfaces 34, 36, the substrate 22 is machined to provide a beveled recess including a first surface 40 generally parallel to surface 34, and a second tapered surface 42 intersecting surfaces 34 and 40 at an angle. As will become apparent hereinafter, the adjacent surfaces 34 and 42 serve as conformal adjacent surfaces to provide a core cross-section defining surface utilized to produce the core-section in a one-half Y-shaped configuration.

The surface 40 functions as a pole tip band in which a plurality of equally spaced generally identical pole tip notches 44 are formed, the lower edges of the notches 44 being coextensive with the line formed by the intersection of tapered surface 42 and surface 40. The depth of the notches 44 corresponds to the width of the surface 40 and, in essence, the rectangular configuration and dimensions of the notches 44 define the width and thickness of the pole tips 30 (30') to be formed as will be described.

Since the fabrication method contemplates the production of a number of laminated, high frequency, magnetic transducers 20 from a single substrate block 22, the number of pole tip notches 44 is proportional to the number of transducers 20 to be produced from the substrate block 22, and, in an illustrative embodiment, would be significant, on the order of several dozen or even several hundred or more. In order to facilitate the later fabrication steps, the substrate block 22 and more specifically the core configuration defining surfaces, including surface 34 and the tapered surface 42, along with the pole tip band surface 40, should be polished flat, for example by mechanical lapping, and cleaned thoroughly. An insulation layer (not shown) on the order of 1500 Angstroms may be deposited over the flat surface 34 and tapered surface 40 of the substrate block 22 in order to improve the electrical insulation of the substrate block if desired. Alternately, a somewhat thicker layer of insulation material may be utilized with a conducting, nonmagnetic material substrate block 22.

Figure 3B:
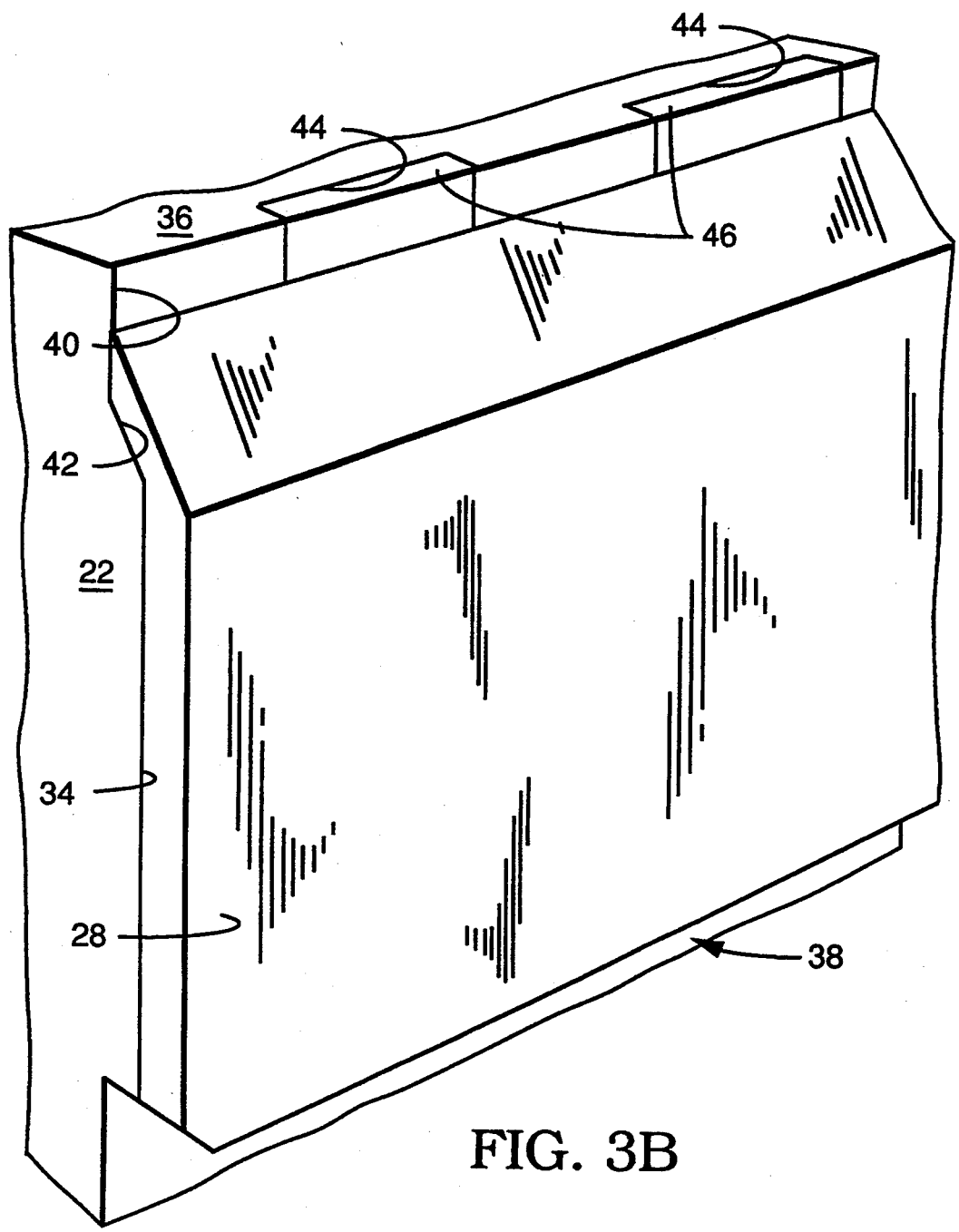

With the substrate block 22 prepared as shown in FIG. 3A, each of the plurality of pole tip notches 44 in the pole tip band surface 40 is filled at the same time with a photoresist 46 commonly utilized in photolithography or chemical etching techniques, the volume and configuration of the photoresist 46 corresponding to the outer dimensions of the notches 44. That is, the notches 44 will be filled, with the photoresist surfaces being coextensive with the surrounding planar surfaces 36 and 40. A conductor 28 layer of a high conductivity nonmagnetic metal, such as copper, is deposited on the core configuration defining adjacent surfaces 34, 42. No part of the conductive layer is deposited on or in the bonding notch 38, and only a minor part is deposited on the pole tip surface 40. This conductor 28 layer, having a thickness on the order of 1 mil, can be deposited by any number of conventional techniques including sputtering, vacuum deposition, ion plating or the like. FIG. 3B depicts the substrate block 22 with the pole tip notches 44 filled with photoresist 46 and the conductor 28 layer deposited on the conformal adjacent surfaces 34, 42.

Figure 3C:
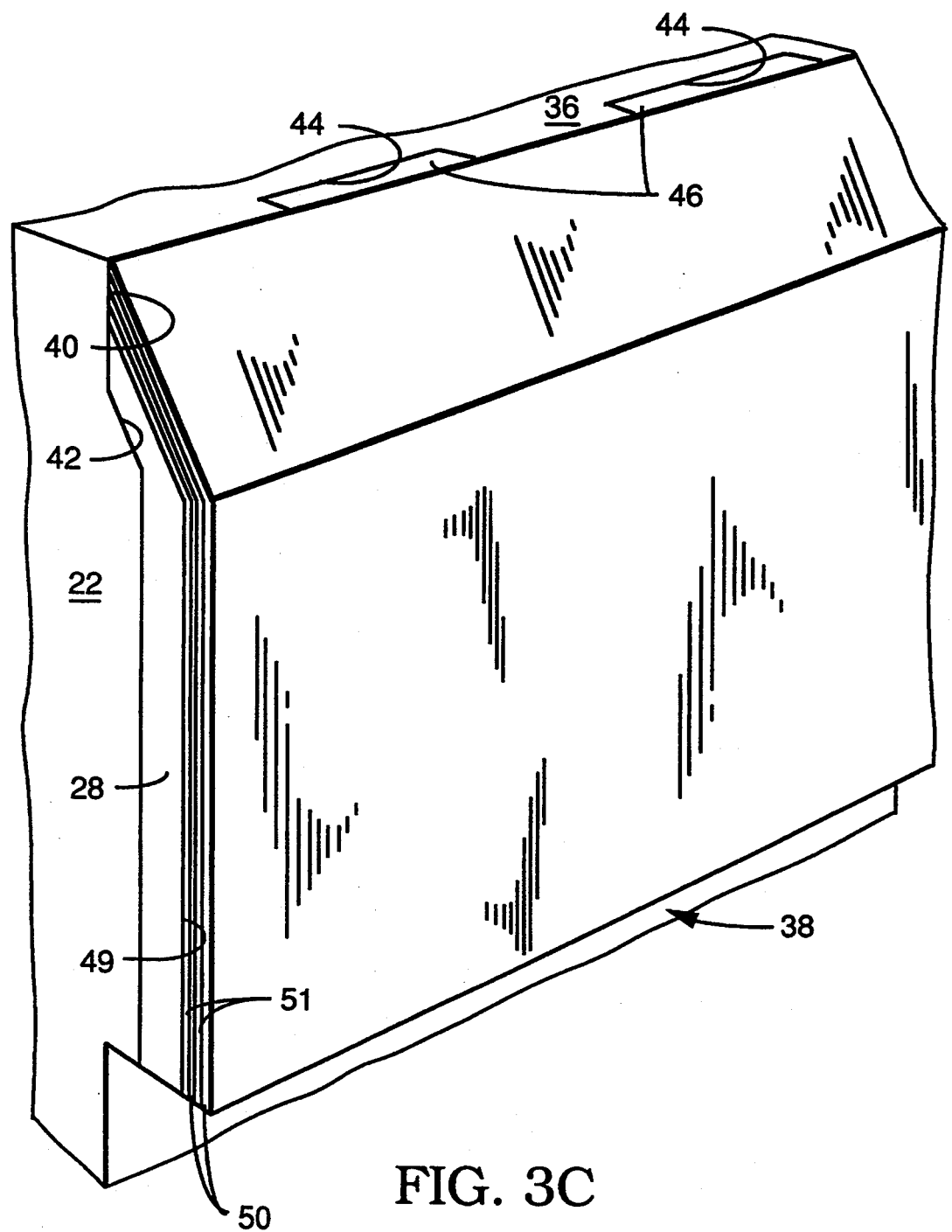

Referring to FIG. 3C, next there is deposited on the conductor 28 layer a first insulation layer 49, having a thickness on the order of 100 to 200 microinches, followed by alternating thin layers 50, 51 of a high permeability magnetic material and an insulator material. As shown in FIG. 3C, this laminate extends over the tapered upper surface 42 to cover the pole tip band surface 40. The thin magnetic material layers 50, each having a thickness on the order of 40 microinches, may be of any number of commercially available magnetic materials such as cobalt-zirconiumniobium (CZN) alloys, iron-aluminum-silicon alloys including Alfesil, Sendust, Spinalloy, or Vacodur each having a nominal composition of 85% iron, 6% aluminum, and 9% silicon, and also amorphous metals. Alumina ($Al_2O_3$) or silicon dioxide ($SiO_2$) are suitable materials for the thin insulator layers 51 which have a thickness on the order of 1 or 2 micro inches. Deposition of the thin insulator and magnetic material layers 50, 51 can also be by any conventional technique such as sputtering, vacuum deposition, ion plating or the like. For purposes of illustration only, and space limitations, the number of magnetic material layers 50 and insulation layers 51 have been shown in FIG. 3C (as well as later figures) to be two each, although it is to be understood that whatever the number of magnetic layers 50, there will be an insulation layer on the outer ones thereof; furthermore, the number of magnetic layers may be as many as ten (10) or twelve (12) in some applications.

Figure 3D:
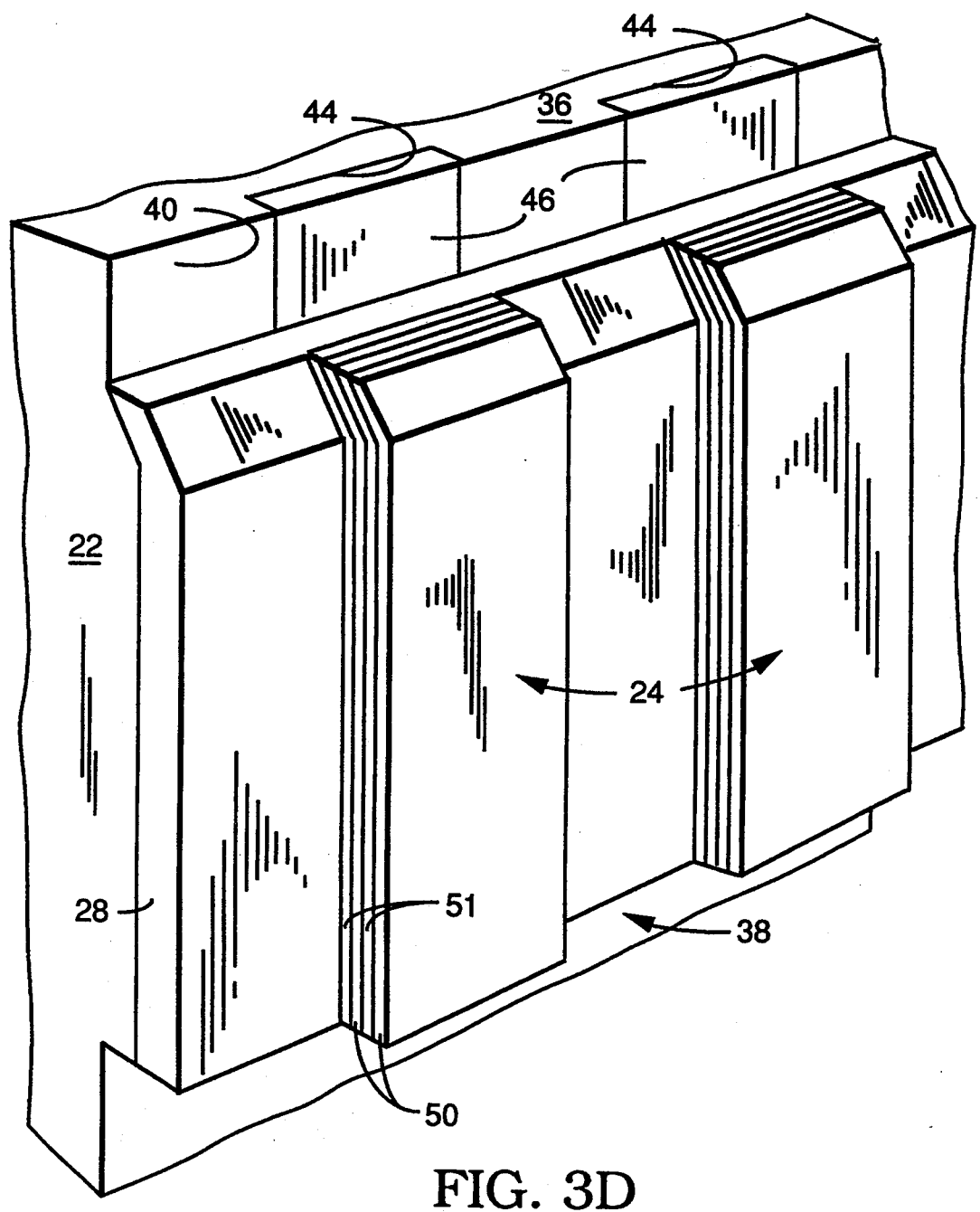

The individual laminated core sections 24, are now formed by removal of laminate material between sections, as depicted in FIG. 3D. The plurality of core sections 24 are parallel to one another and each extends in alignment with and downwardly from one of the pole tip notches 44. The array of core sections 24 is formed by selective removal of all of the thin laminate layers 50, 51 and the bottom insulation layer 49 to thereby expose the conductor 28 layer, as depicted in FIG. 3D. For selective removal of this material, reactive ion beam etching (RIBE) can be employed or photochemical etching can be employed utilizing a developed photoresist. As shown, the material has been removed from between adjacent like core sections 24, and, likewise the material along the pole tip band surface 40 has been removed until the upper or distal ends of the core sections 24 are coplanar and lie in a plane generally perpendicular to the plane of the surface 40. As shown, each of the laminated core sections 24 is parallel to an adjacent like core section 24.

Figure 3E:
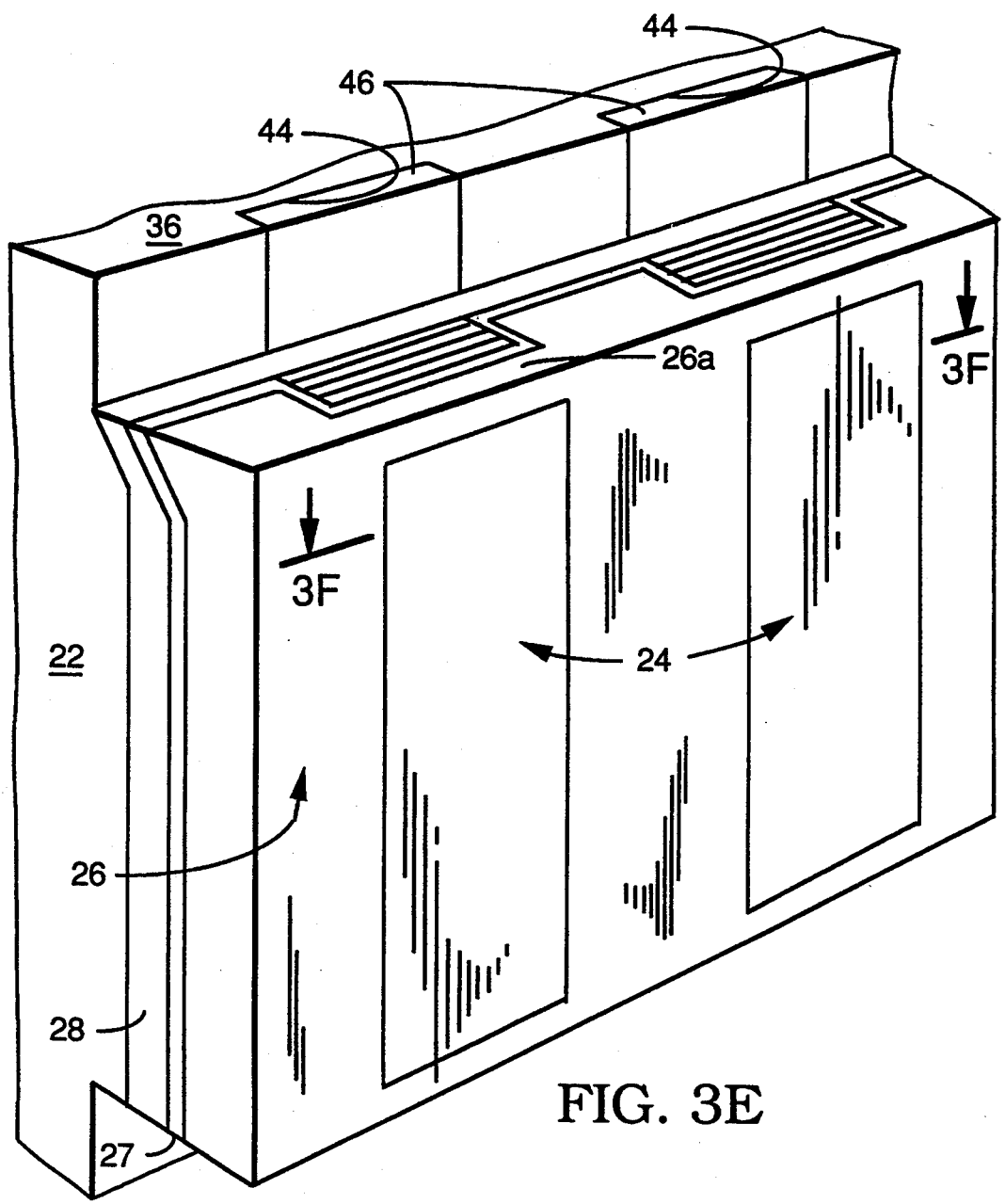
Figure 3F:
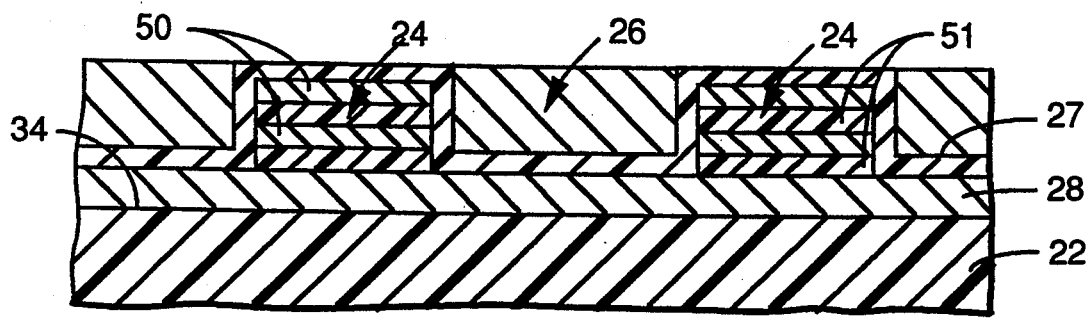

Referring to FIGS. 3E and 3F after the laminated core sections 24 are formed, a top insulation layer 27 (See also FIG. 2) is deposited over the now exposed surface which includes the conductor 28 layer, as well as the exposed front surfaces, as well as side edges of the laminated core sections 24. This layer 27 is a layer of generally uniform thickness which will follow the contour of the exposed surfaces and edges. Following deposition of the insulation layer 27, the entire exposed surfaces of the workpiece have deposited thereon a conductor 26 layer, the deposition of which is of sufficient thickness to form a surface generally parallel to the original surface 34 of substrate block 22. By reference to FIG. 3F, it can be seen that the surface of conductor 26 layer is coplanar with the insulation layer 27 deposited in the preceding step. The conductive material layer is sufficient to cover, as shown in FIGS. 3E and 3F, the laminated core sections 24, the area between and below the laminated core sections 24, as well as the pole tip band surface 40 and the pole tip notches 44. This top conductor layer 26 has a dimension on the order of 0.5 mil thickness in the space between adjacent core sections 24.

Figure 3G:
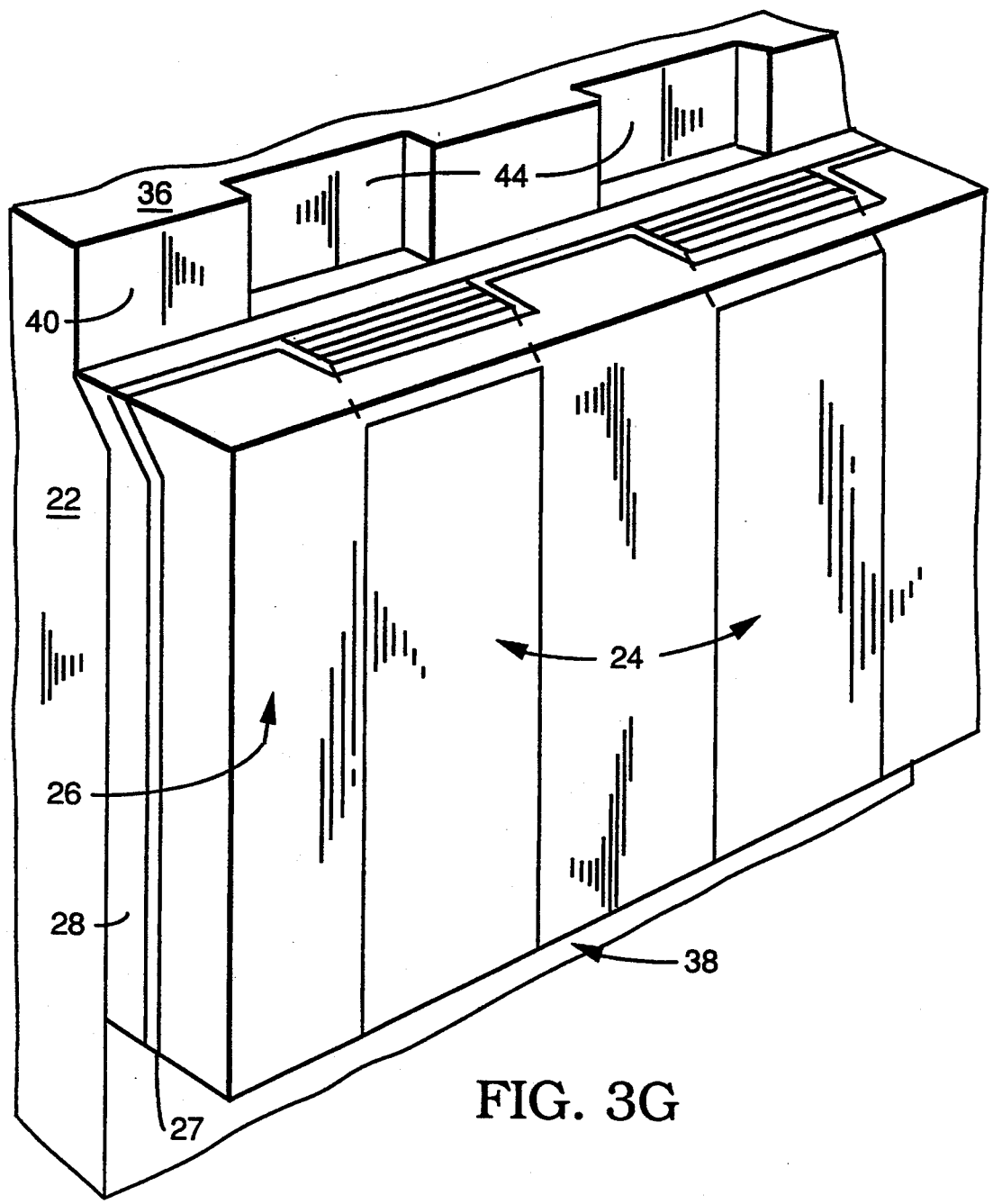

Referring now to FIG. 3G, the next step entails removal, from the pole tip band surface 40 above the laminated core sections 24, the photoresist 46 in the pole tip notches 44. This establishes a common plane through the exposed distal ends of the upper bent arms of the laminated core sections 24, which plane is perpendicular to the plane of the pole band surface 40 and to the plane of the remaining conductor 26 layer. Both surfaces at the top and bottom edges of the top conductor 26 layer are removed such that the plane of the remaining top edge of the conductor 26 layer is contiguous with the bottom surface of the pole tip notches 44 and the bottom edge of the conductor 26 layer is contiguous with the bottom edge of the laminated core sections 24.

Figure 3H:
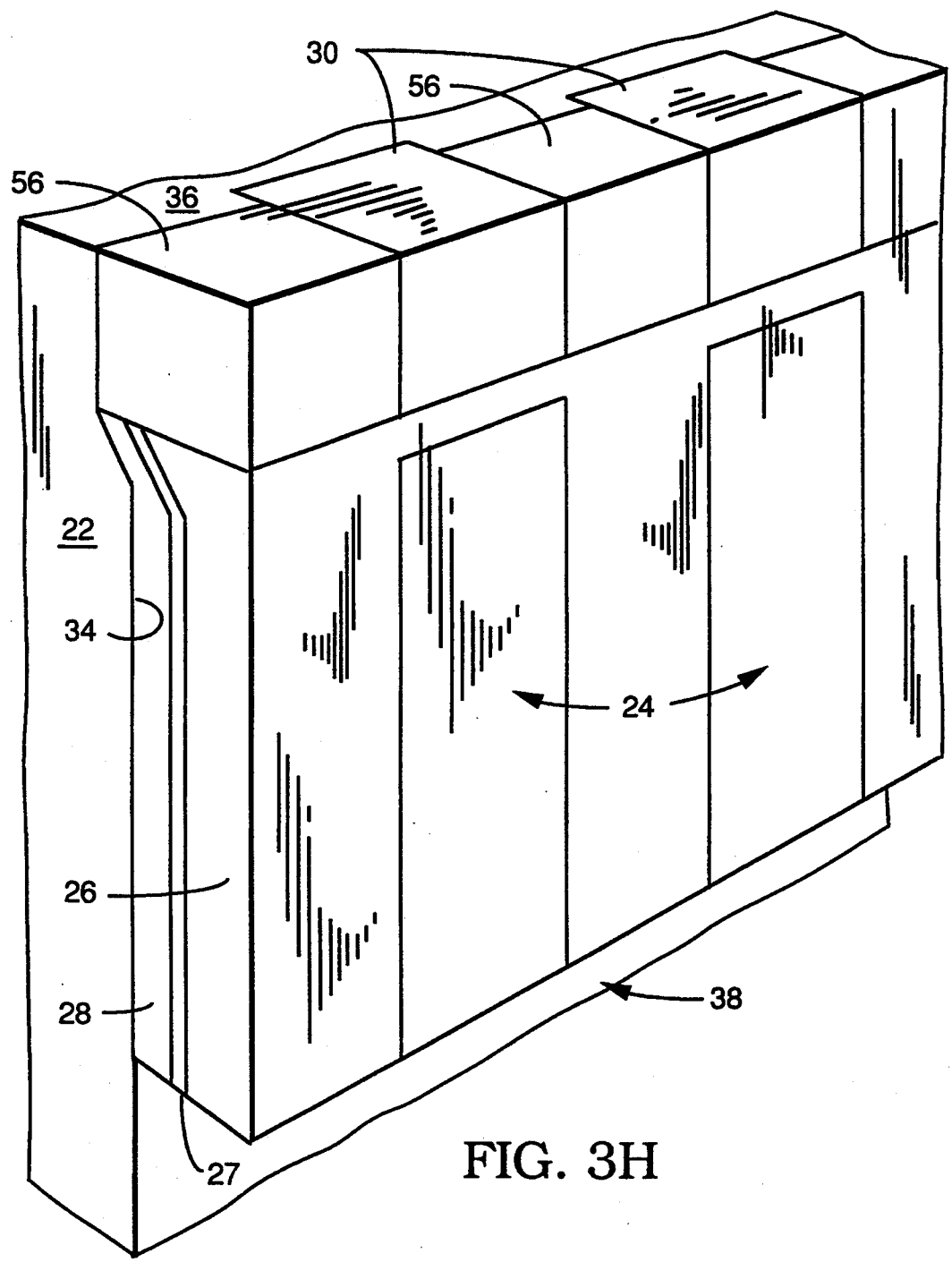
Figure 3I:
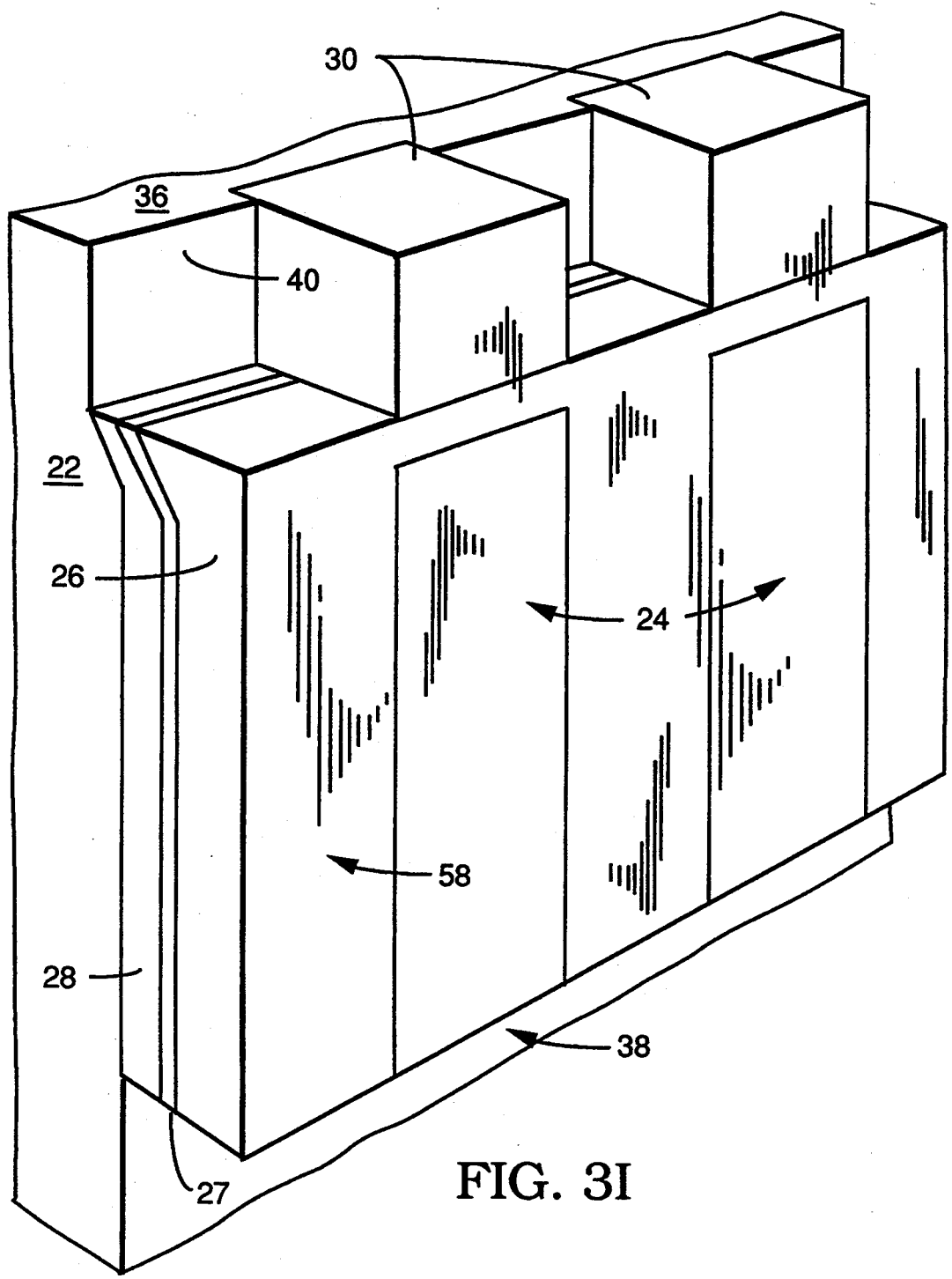

As illustrated in FIG. 3H, the areas intermediate the pole tip notches 44 along the pole tip band surface 40 are masked with a suitable photoresist 56, the portions being generally bar-shaped and having intersecting surfaces coplanar with the upper surface 36 of block 22 and the remaining surface of the conductor 26 layer, respectively. Then, the pole tips 30 are sputtered into the remaining box-like openings, which include the pole tip notches 44 in the pole tip band surface 40 and the space between the adjacent bar-shaped photoresist portions 56, above the laminated core sections 24. The magnetic alloy material for the pole tips 30 is the same magnetic material used for the thin magnetic layers 50 in the laminated core sections 24, and is sputtered in direct contact with the upper distal ends of the laminated core sections 24. In this manner, the pole tips 30 form a continuous magnetic path with the like laminate material of the laminated core sections 24.

Figure 3J:
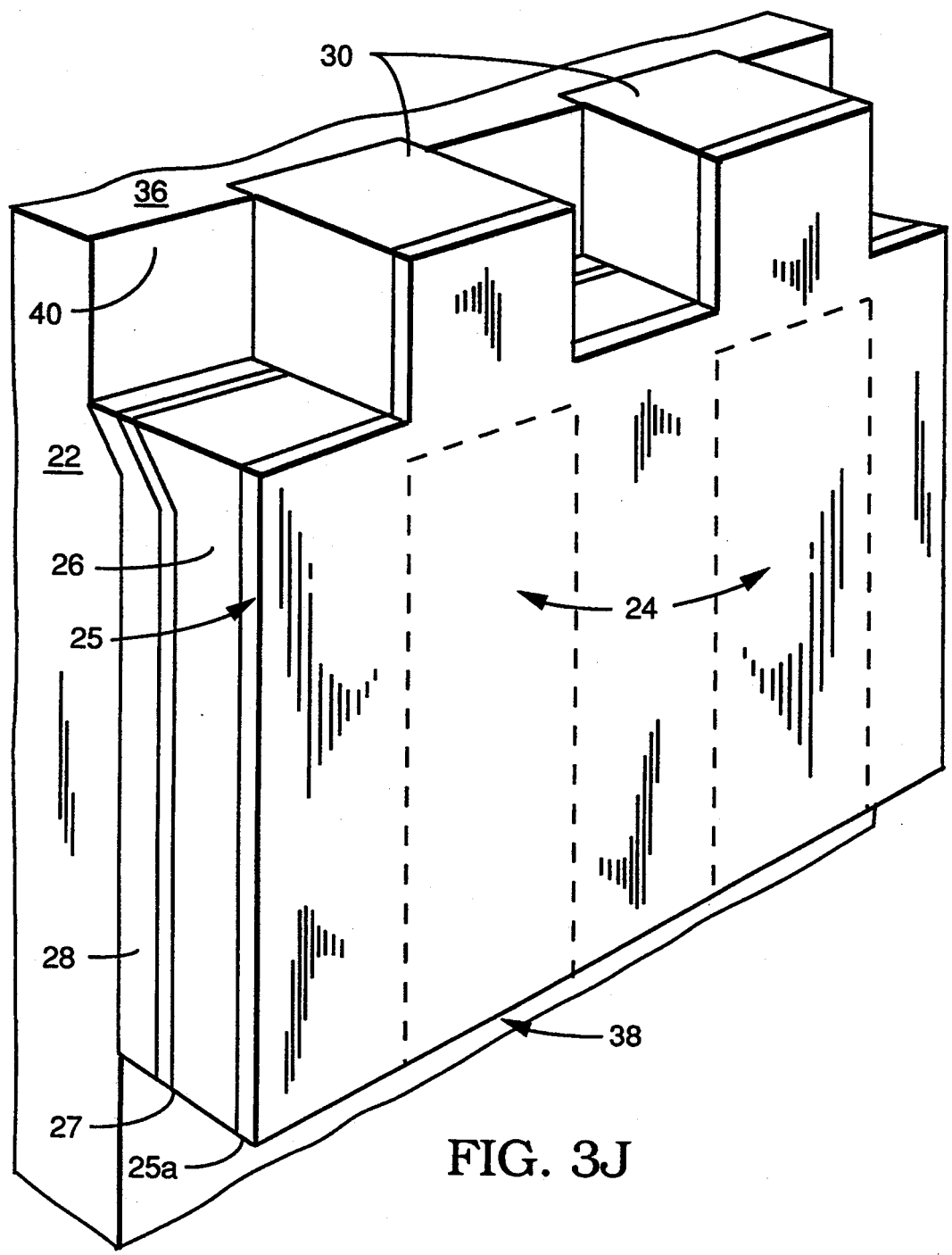

Following removal of the photoresist 56 from between the sputtered pole tips 30 (see FIG. 3I), the front face or gap confronting surface or plane 31, including the face of the laminated core section 24, the face of the top conductor layer 26 and the face of the pole tips 30, are lapped or polished to provide a smooth, flat surface thereon. Machine lapping or planarization using the RIBE process can be used for this purpose. During this lapping or polishing operation, substantially all of the insulation layer 27 overlying the core sections 24 (See FIG. 3F) is removed to expose the metallic laminate of the core sections 24, this lapping or polishing operation creating a very flat very uniform plane, referred to as a gap plane 58. The gap plane 58 is then deposited with a gap insulation layer 25a having a thickness of one-half the desired gap spacing (depicted as a single gap layer 25 in FIG. 2) for the completed magnetic transducer 20, one-half of which is now essentially completed as shown in FIG. 3J.

Figure 3K:
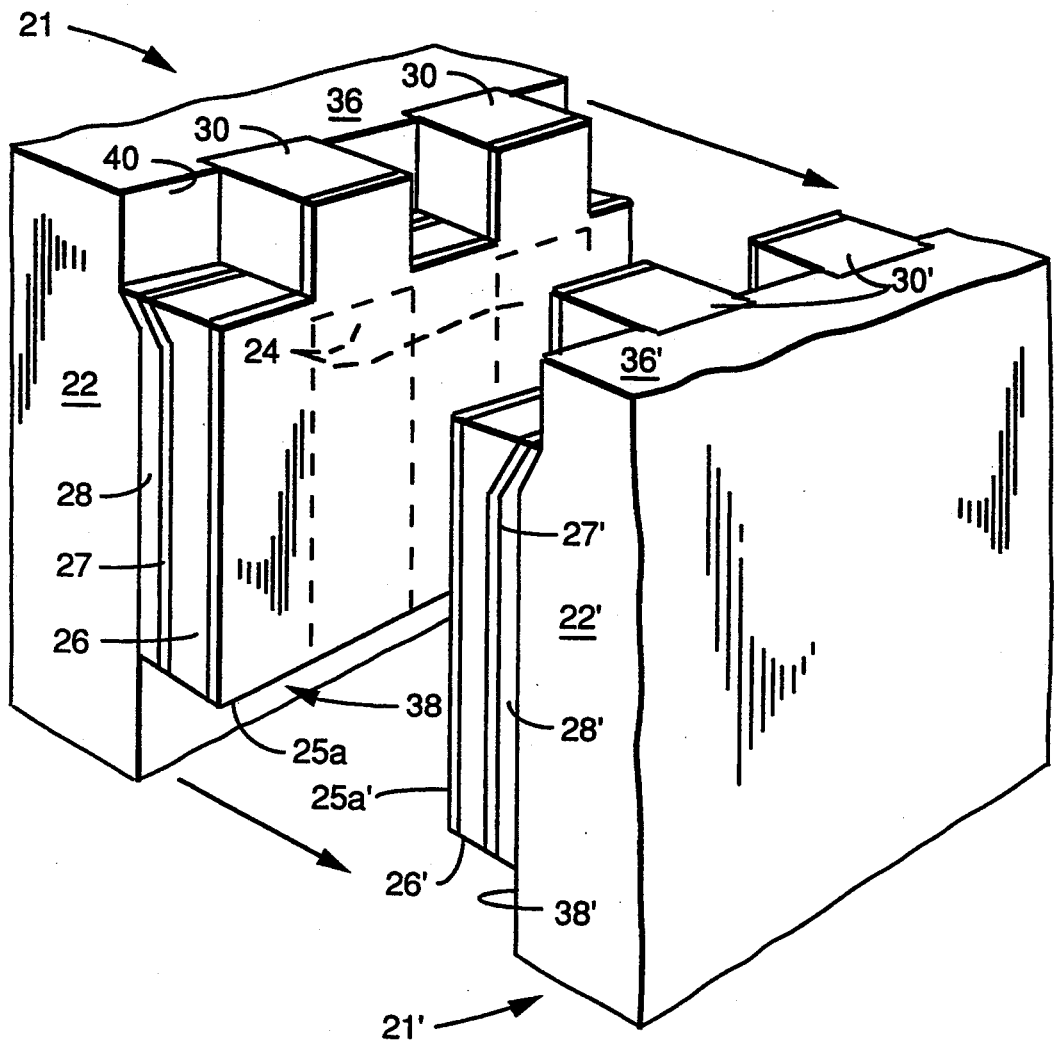
Figure 3L:
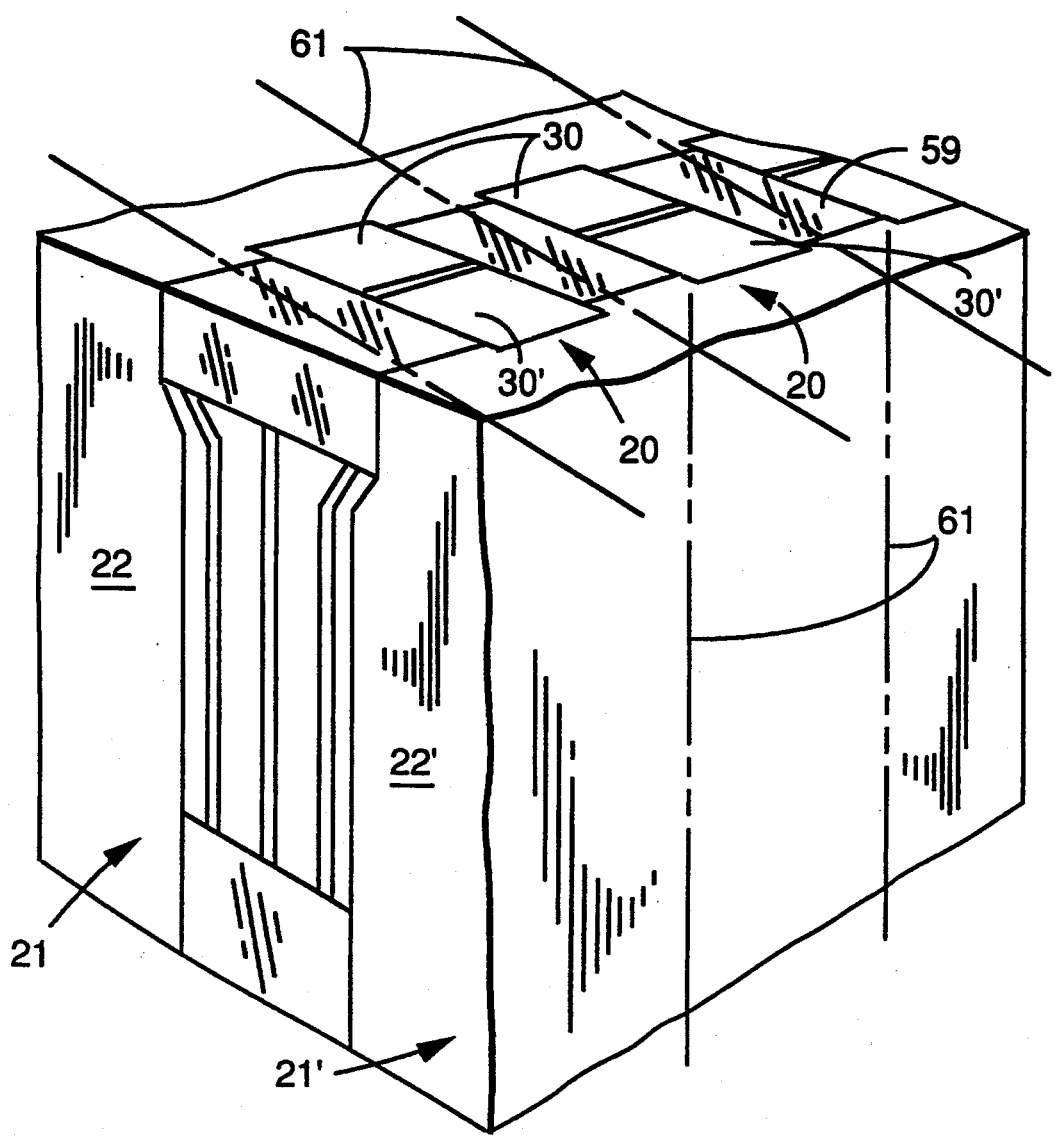

Two individual halves or transducer head sections 21, 21' of the transducer 20 are then positioned face-to-face, namely gap confronting surface to gap confronting surface with the laminated head core sections 24 and pole tips 30 aligned with each other in the X and Y directions across the gap confronting surfaces. The gap confronting surfaces are essentially those portions shown in dotted lines and depicted with the reference numeral 24 which are the portions of the core sections below the gap layer 25a. Like elements on the section 21' bear the same reference numerals as head section 21 followed by an apostrophe (') for ease of illustration. The two head sections 21, 21' are then glass bonded together in a conventional manner as shown in FIG. 3K to produce the block of transducers 20 as illustrated in FIG. 3L. With the two head sections 21, 21' clamped together, the lower notches 38, 38' collectively form a first bonding notch. Similarly, a second or upper bonding notch is formed in the spaces between adjacent pairs of adjoined pole tips 30, 30 and 30', 30'. The glass 59 fills the spaces within these upper and lower bonding notches so formed.

Figure 3M:
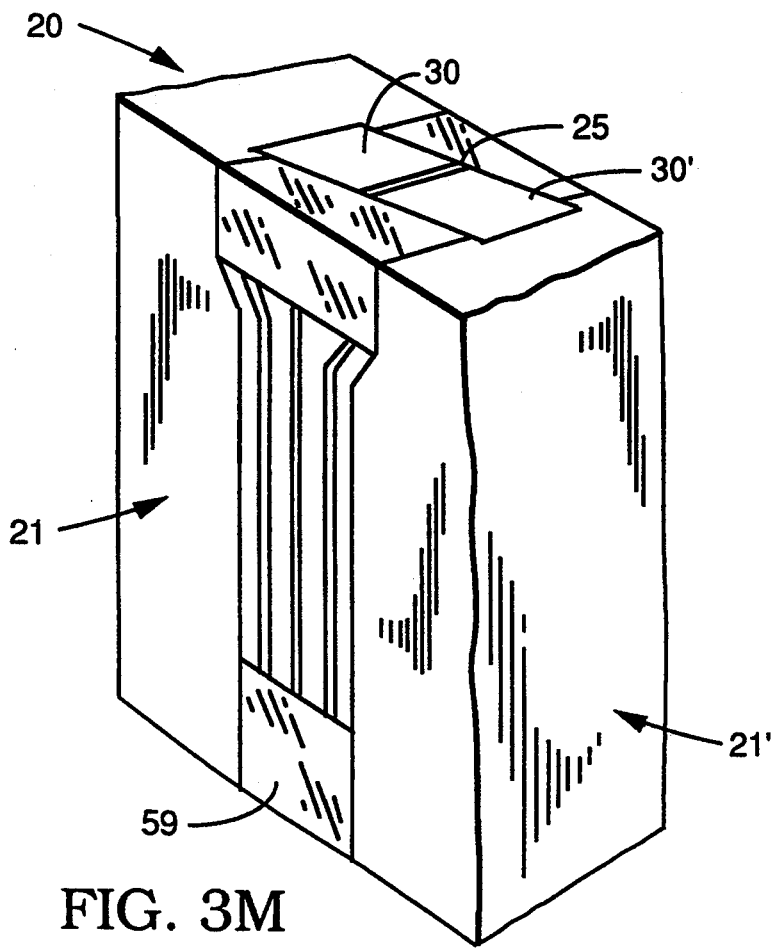

Individual transducers 20, as illustrated in FIG. 3M, are then obtained by slicing or dicing the thus joined substrate blocks 22, 22' along the cut lines 61 shown in FIG. 3L. These cut lines 61 would normally be at an angle relative to the side of the substrate block 22, 22' to create the desired angle for azimuth recording. While the individual transducers 20 can be sliced off one at a time, it would normally be the practice to gang slice all of the transducers 20 at the same time in a single pass.

Figure 4:
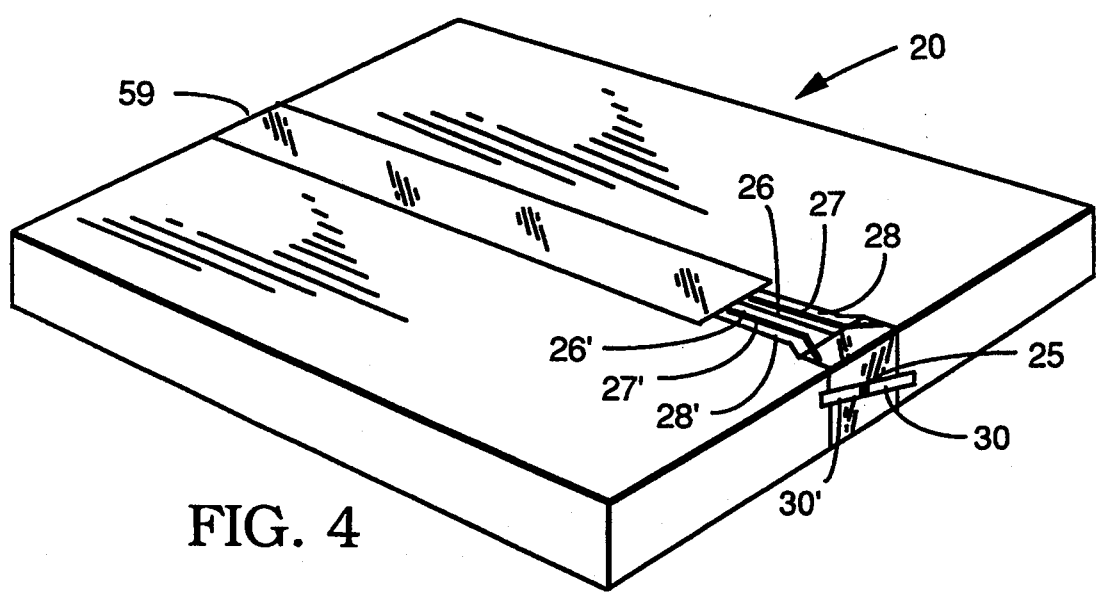
FIG. 4 is an enlarged perspective view of an individual laminated, high frequency, magnetic transducer of the present invention.

Both of the conductor 26, 28 layers run the entire length of the adjoined or clamped substrate blocks 22, 22. After cutting, as illustrated in the enlarged perspective view of an individual transducer 20 of FIG. 4, the edges of both conductor 26, 28 layers are exposed at the surface of the transducer 20 below the glass fill 59 around the pole tip 30. For purposes of further describing the transducer 20, the bottom, or first deposited conductor 28 layer will be referred to as the outer conductor 28, the top, or last deposited conductor 26 layer will be referred to as the inner conductor 26 and an apostrophe (') will be used to designate the right hand or second half of the transducer 20 with the left hand or first half having the simple numeral designation.

Figure 5:
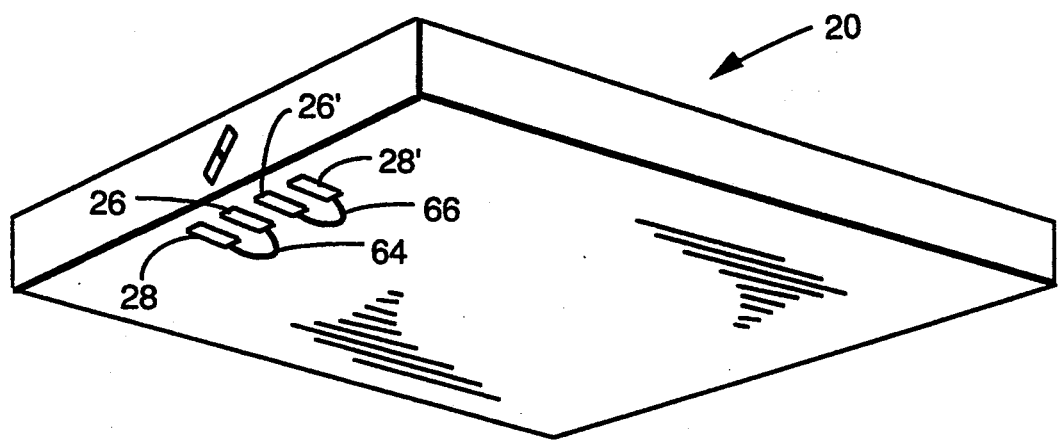
FIG. 5 is a bottom perspective view of the laminated, high frequency, magnetic transducer of the present invention illustrating jumpers connected to the conductor strips on the bottom of said transducer in a two-turn configuration.
Figure 6:
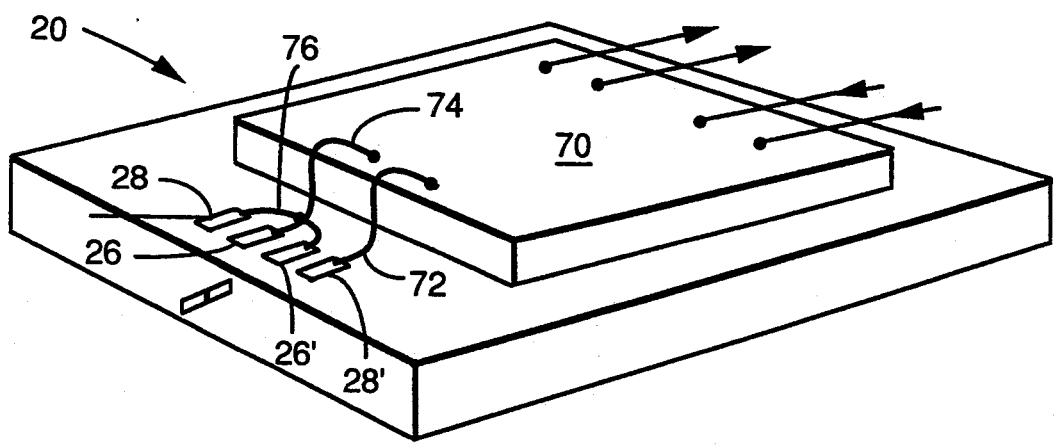
FIG. 6 is a top perspective view of the laminated, high frequency, magnetic transducer of FIG. 5 illustrating an integrated preamp connected to the conductor strips on the top of said transducer.

With the outer conductors 28, 28' and inner conductors 26, 26' so exposed, it is possible to connect these conductors to function as one or two coil turns by the use of an appropriate jumper hook-up. Referring now to FIGS. 5 and 6, opposing surfaces of the transducer 20 are depicted, with FIG. 5 illustrating the outer conductor 28 connected to adjacent inner conductor 26 by a first jumper 64 and the other outer conductor 28' connected to adjacent inner conductor 26' by a second jumper 66. On the opposite surface as shown in FIG. 6, a jumper 76 interconnects outer conductor 28 to inner conductor 26', with connections to conductors 26 and 28', such as by leads 74 and 72, respectively, thereby achieving a two-turn signal coil configuration.

Further, a small integrated circuit preamp 70 may be placed directly on the opposite side of transducer 20 such as illustrated in FIG. 6. One preamp lead 72 is connected to outer conductor 28' and the other preamp lead 74 is connected to inner conductor 26. This arrangement of a preamp 70 physically attached to the transducer 20 provides very short leads from the head turns of the signal coil to the preamp 70, thereby reducing the capacitance and inductive losses associated with long leads at the high frequencies for which the transducer 20 is designed.

Figure 7:
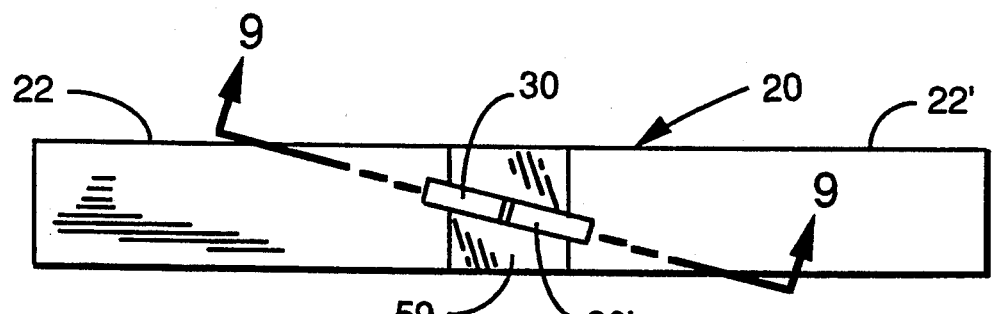
FIG. 7 is a top plan view of the laminated, high frequency, magnetic transducer of FIGS. 4–6.
Figure 8:
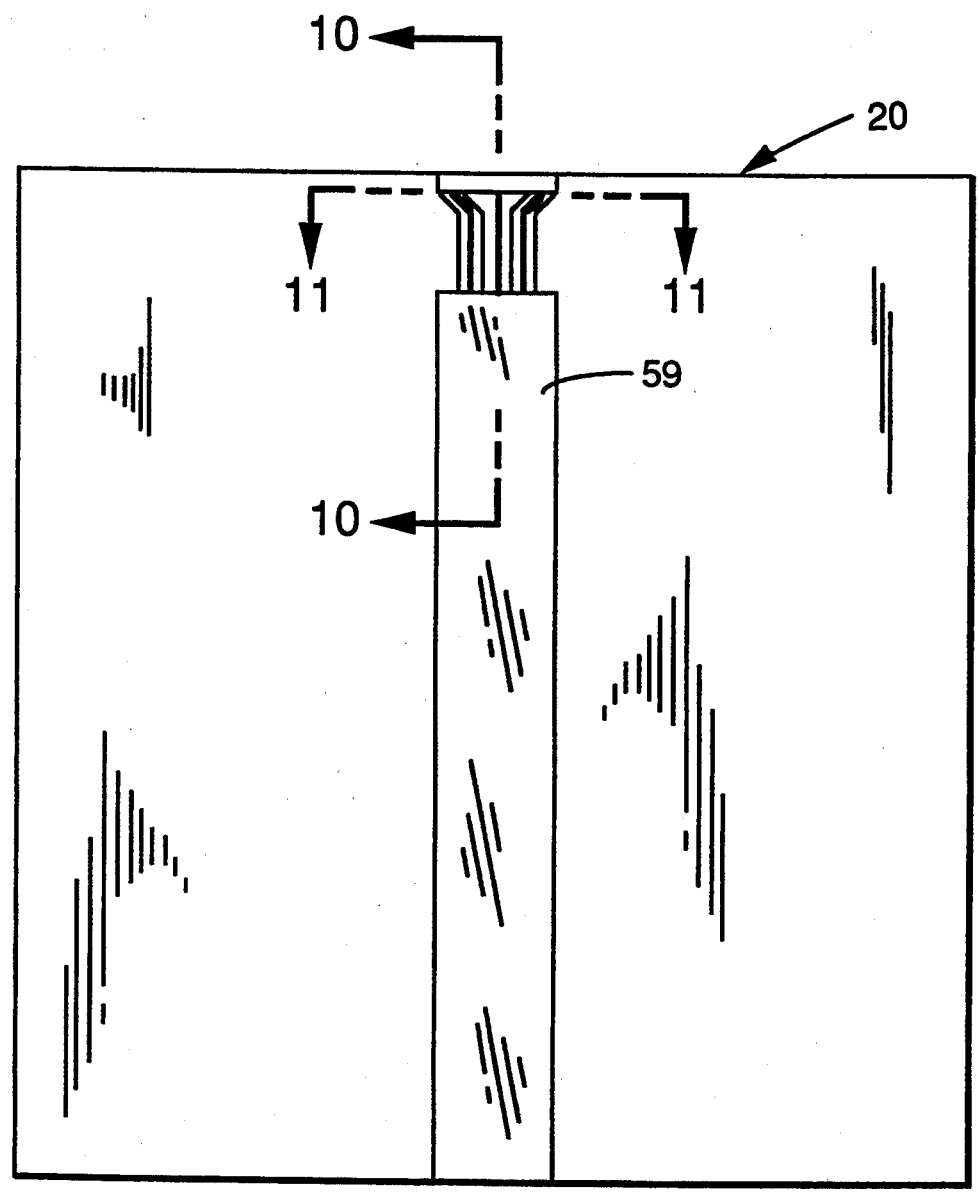
FIG. 8 is a front plan view of the laminated, high frequency, magnetic transducer of FIGS. 4–6.
Figure 9:
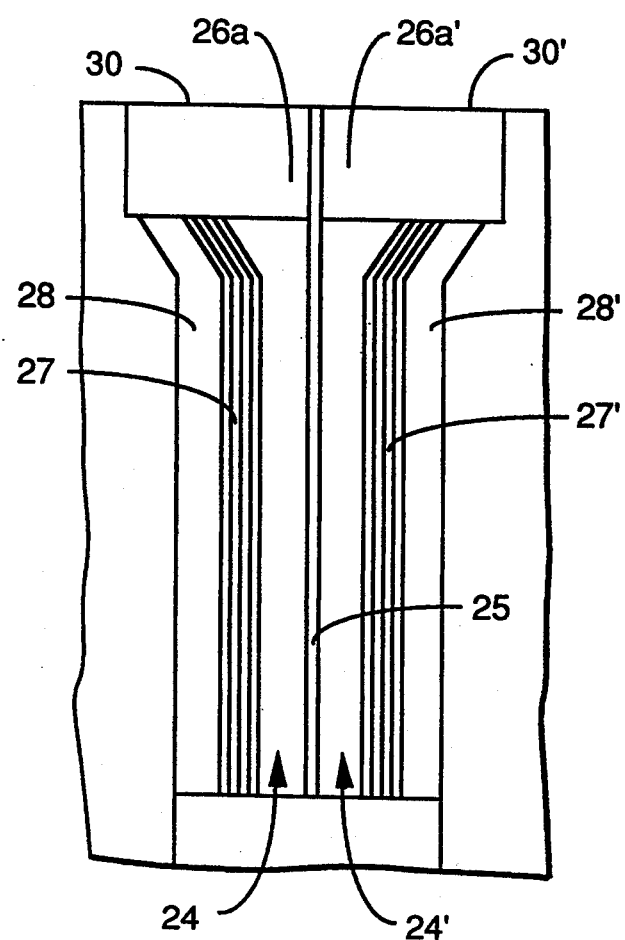
FIG. 9 is a sectional view taken generally along the line 9—9 of FIG. 7.
Figure 10:
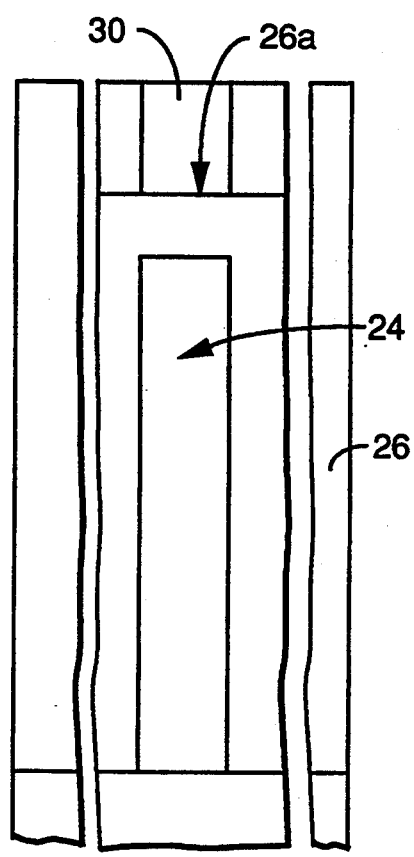
FIG. 10 is a sectional view taken generally along the line 10—10 of FIG. 8.
Figure 11:
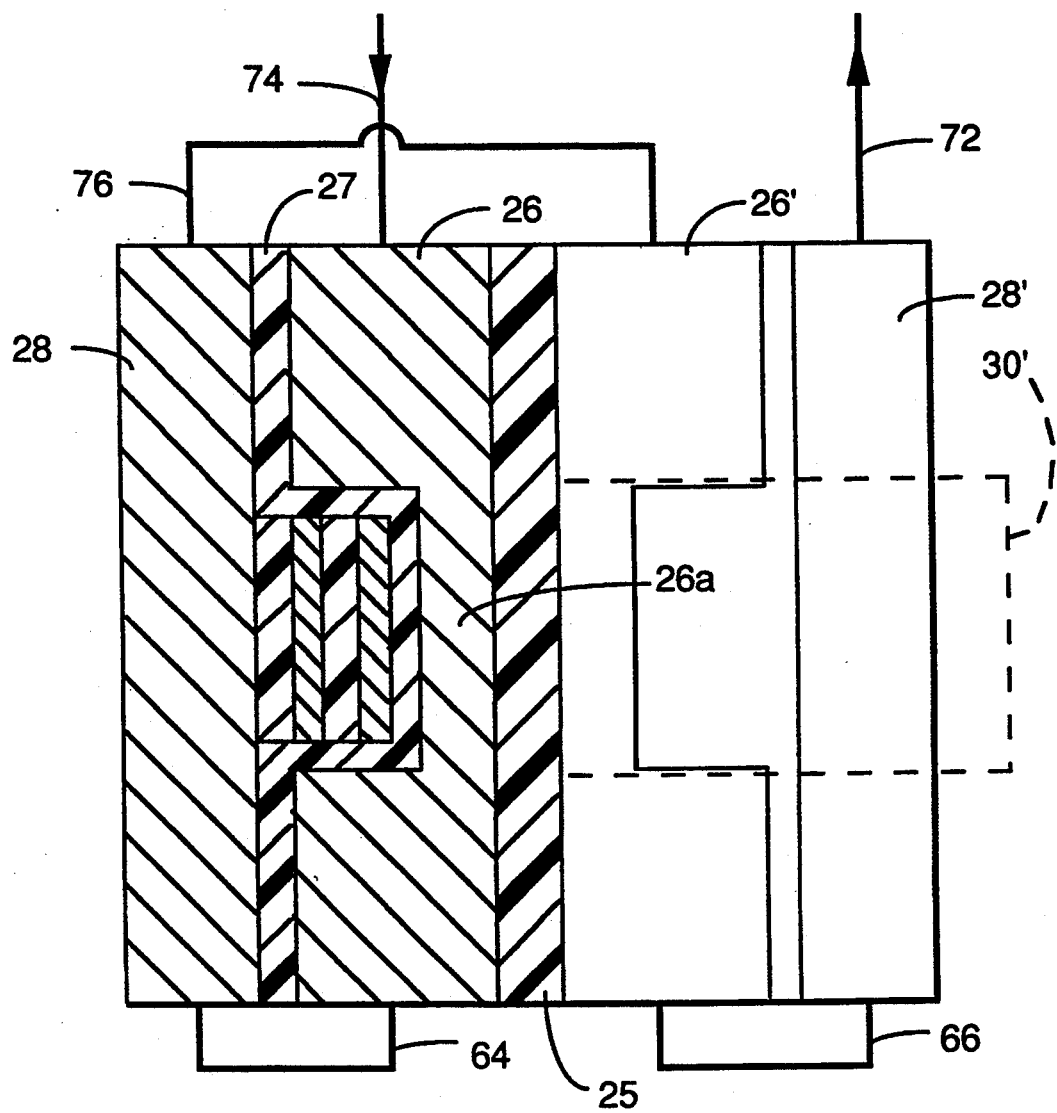
FIG. 11 is a sectional view taken generally along the line 11—11 of FIG. 8 with jumpers and leads shown to correspond to the electrical connections shown in FIGS. 5 and 6.

Additional details of the completed transducers 20 are described in plan views, FIGS. 7 and 8, and sectional views, FIGS. 9-11. Each transducer 20 includes a pair of opposing laminated core sections 24, 24' separated by the gap insulation layer 25 which also separates the corresponding pair of opposing pole tips 30, 30'. As best illustrated in FIG. 9, the top of the opposing laminated core sections 24, 24', each comprising alternating thin magnetic and insulation layers, 50, 51 and 50', 51', is generally tapered outward such that the laminated core sections 24, 24' together form a generally Y-shaped configuration. The bottom insulation layer 27, now referred to as the outer insulation layers 27, 27' are disposed on either side of the laminated core sections 24, 24' followed by the outer conductors 28, 28', each of which conform to the generally Y-shaped configuration of the opposed laminated core sections 24, 24'. Inside of the wide portion at the top of the Y-shaped configuration on either side of the gap insulation layer 25 are the crosspiece portions or bight portions 26a, 26a' of the inner conductors 26, 26' (See also FIGS. 2 and 10). With the process employed, the combined bight portions 26a, 26a', along with the intervening portion of the insulation gap layer 25, substantially fill the throat of the V-shaped winding window formed at the juncture of the two arm portions of the core sections 24, 24'. Pole tips 30, 30' are disposed over the top of the Y-shaped laminated core sections 24, 24' which are backed by the substrate 22 and held together by the glass fill 59. The pole tips 30, 30' extend outwardly (relative to the plane of the insulation gap 25) slightly beyond the outer insulation layers 27, 27' and the outer conductors 28, 28' of the Y-shaped laminated core sections 24, 24'.

The physical size of the transducer 20 is quite small. By way of example, the length and width of an individual transducer 20 would be in the order of 0.100 inches while the thickness would be in the order of 0.017 inches. More importantly, the size of the magnetic core is extremely small with the length of the laminated core sections 24, 24' on the order of 0.005 inches and the height of the pole tips 30, 30' on the order of 0.0005 inches. The height of the inner conductors 26, 26' at the center of the Y-shaped configuration of the laminated core sections 24, 24' would also be on this same order, namely 0.0005 inches. The width of the combined laminated core sections 24, 24' at the wide Y-shaped top end would be about 0.002 inches with the combined width of pole tips 30, 30' approximately 0.0035 inches. The depth of the pole tips 30, 30' and the laminated core sections 24, 24' would both be on the order of 0.001 inches.

FIGS. 9 and 10 dramatically illustrate the available magnetic flux paths, with FIG. 10 being a section along the plane of the insulation gap 25, with the insulation removed. Utilizing the dimensions above with reference to FIG. 10, the width of the pole tip 30 is 0.001 inch with the thickness (vertical dimension as depicted) being 0.0005 inch (corresponding to the gap depth), which is about the same dimension as the thickness of the bight portion 26a of conductor 26. With an overall vertical dimension of about 0.0055 inch from the upper surface of pole tip 30 to the lower edge of the laminated core section 24, this leaves a dimension of about 0.0045 for the length of the leg portion of the core section 24 below the throat of the V-shaped opening. The axial length of the throat portion is thus about 10% of the overall length of the core section 24. High flux coupling efficiencies are obtained as a consequence of several factors, to wit, the gap depth is very small and the coil is placed dose to the pole tip, (that is, the bight portion 26a of the inner conductor 26 is in close proximate relation to both the read/record gap and the magnetic media, such as tape to be utilized), and further, the bight portion 26a substantially fills the spacing between the arm portion of the core section 24 and the insulation gap layer 25, and additionally, the back gap length (formed by adjoined leg portions of the core sections 24) is of substantially greater area than the read/write gap area of the opposing pole tips.

The small physical size of the magnetic core results in a short magnetic path length that is essentially the distance around the inner conductors 26, 26'. By having the magnetic path extremely short, the core reluctance becomes less dependent on the core permeability, resulting in significant gains in flux efficiency in the 100 to 150 MHz frequency range. The permeability in this frequency range can be substantially reduced by eddy current losses and other frequency effects which are minimized by fabricating the core sections from thin laminations. While the permeability of a single 40 micro inch layer of the magnetic alloys used in these transducers 10 can be in the range of 500, which is very good, the permeability of a multi-layer core can drop well below this value due to the quality of the electrical insulation between the magnetic layers and the induced stress that can develop with a large number of magnetic layers. Accordingly, reducing the dependence on core permeability becomes very important to ensure a relative high flux efficiency at frequencies in the 100 to 150 MHz range.

Because of the small transducer size, the entire core will be in contact with the magnetic tape which moves over the pole tips 30, 30' in a direction perpendicular to the gap 25 plane. The thickness of the pole tips 30, 30', with gap 25 therebetween, defines the track width of the transducer 20 which can be mounted on a video head scanner in any conventional manner.

Since the pole tips 30, 30' are of a solid magnetic material, rather then laminated, the wear resistance of the pole tips 30, 30' will be improved. The laminated core sections 24, 24' are not exposed to the magnetic video tape since the individual thin insulation layers 51, 51' in the laminate can act as gaps which will cause undulations commonly referred to as secondary gap ripples.

The inner and outer conductors 26, 26' 28, 28' are closely integrated with the laminated core sections 24, 24' which reduces leakage inductance. Conventional spiral conductors in thin film transducers have considerable leakage inductance which will degrade the performance of the video head. By forming winding windows at the confluence of the arm portions of the core sections 24, and substantially filling the winding windows with the bight portions 26a, 26a' of the deposited conductors 26, 26', virtually all flux in and around the gap 25 intruding into the window area will be coupled to the winding coil within the window, thereby minimizing or eliminating leakage flux paths.

The transducer 20, shown and described herein, is designed for high frequency, bandwidth systems. As a result of the small core size, there is a likelihood of a measurable "head bump" occurring due to the fact that the flux, which is picked up by the extreme ends of the head core, is out of phase with the flux picked up by the gap 25. This secondary flux pick up alternately destructively and constructively interferes with the primary signal flux at the gap 25, which in turn produces decaying undulations that are referred to as "head bumps". The first bump occurs at a wave length that corresponds to the length of the core that is in contact with the tape. Thus, by extending the length of the pole tips 30, 30' beyond the laminated core sections 24, 24', the wave length at which the first bump occurs is increased and the frequency is thereby lowered. In addition, the high frequency efficiency of pole edge reading will be reduced, thereby reducing the peak amplitude of the edge reading pulse.

The size of the magnetic core is extremely small which results in a short magnetic path length that is essentially the distance around the inner conductors. By having the magnetic path extremely short, the core reluctance becomes less dependent on the core permeability, resulting in significant gains in flux efficiency in the 100 to 150 MHz frequency range. The permeability in this frequency range can be substantially reduced by eddy current losses and other frequency effects which are minimized by fabricating the core sections from thin laminations.

Also, because of the small transducer size, the entire core will be in contact with the magnetic tape which moves over the pole tips. The wear resistance of the pole tips will be improved since they are of a solid magnetic material, rather then laminated. The laminated head core sections are not exposed to the magnetic video tape. In addition, leakage inductance is reduced since the inner and outer conductors are closely integrated with the laminated head core sections.

The entire transducer 20 is fabricated by high volume production, extremely high accuracy, and low cost techniques such as material deposition and photolithographic processes. With batch fabrication, all of the magnetic core material for a large number of transducers 20 is deposited during the same process step and all of the transducing gaps are formed at the same time. This results in a high degree of uniformity for all of the transducers.

A wide variety of modifications and improvements to the laminated, high frequency, magnetic transducer and manufacturing method therefor described herein are believed to be apparent to those skilled in the art. Accordingly, no limitation on the present invention is intended by way of the description herein, except as set forth in the appended claims.

What is claimed is:

1. A magnetic transducer for reproducing and/or recording high frequency signals with a magnetic medium, comprising:
   an insulation gap layer;
   a pair of opposed magnetic core sections separated by the insulation gap layer and bonded together, each magnetic core section comprising a lamination of a plurality of thin alternate layers of magnetic material and insulation material and configured such that a major portion of their lengths are opposed together width a pair of distal diverging ends of said pair of magnetic core sections forming respective openings at either side of the insulation gap layer;
   a pair of outer insulation layers disposed on the outer surfaces of said pair of opposed magnetic core sections;
   a pair of electrical outer conductors disposed on said pair of outer insulation layers;
   a pair of electrical inner conductors disposed with segments thereof within said respective openings of the distal diverging ends, one of said pair of inner conductors and segments on either side of said insulation gap layer; and
   a pair of solid, magnetic material pole tips operably disposed on facing surfaces of the respective distal diverging ends of said pair of opposed magnetic core sections and separated by said insulation gap layer such that one of said pole tips is disposed over the ends of one magnetic core section and segment, and other of said pole tips is disposed over the ends of the other magnetic core section and segment.

2. The magnetic transducer of claim 1 further including means to electrically connect said inner and outer conductors of said pair of laminated magnetic core sections to form a signal coil for retrieving and applying said high frequency signals.

3. The magnetic transducer of claim 2 further including preamp means physically secured to said transducer proximate said core sections and electrically connected to said signal coil.

4. A magnetic transducer for reproducing and/or recording high frequency signals with a magnetic tape medium, comprising:
   a first magnetic core element and a second magnetic core element together forming a generally Y-shaped configuration when opposed face-to-face, each magnetic core element comprising:
   a. a plurality of thin alternate layers of magnetic material and insulation material;
   b. an outer insulation layer disposed on the outer surface of said core element;
   c. an outer conductor disposed on said outer insulation layer;
   d. an inner conductor disposed on the inner surface of said core element and including a segment in the outwardly extending arm portion of the one-half of the Y-shape;
   e. a solid, magnetic material pole tip operably disposed on the distal end of the arm portion of said core element over said segment; and f. a substrate backing said core element including said outer conductor and a portion of said pole tip;

an insulation gap layer disposed between said first and second magnetic core elements;

bonding means to maintain said first and second magnetic core elements in said Y-shaped configuration around said insulation gap layer; and means for electrically interconnecting said inner and outer conductors of said first and second magnetic core elements for forming a signal coil.

5. The magnetic transducer of claim 4 further including preamp means physically connected to said magnetic core elements and electrically connected to said signal coil.

6. A magnetic transducer for reproducing and/or recording high frequency signals with a magnetic tape medium, comprising:

first and second magnetic core elements together forming a generally Y-shaped configuration when opposed face-to-face, each magnetic core element comprising:

a. a substrate having a core configuration defining surface including a first generally planar surface and a second generally planar surface contiguous with said first surface at an angle thereto, said substrate further including a pole tip surface contiguous with said second surface and defining a plane generally parallel to said first surface;

b. a first conductor layer on said core configuration defining surface;

c. a first insulation layer on said first conductor layer;

d. a laminated core section disposed on said first insulation layer, said laminated core section having a plurality of thin alternate layers of magnetic material and insulation material, said core section, said first insulation layer and said first conductor layer having cross-sections conforming to said core configuration defining surface;

e. a second conductor layer having a segment thereof on said laminated core section at the portion corresponding to said second surface; and f. a solid, magnetic material pole tip formed, at least in part, in said pole tip surface in magnetic relation with the top of said core section and in overlying relation with said first insulation layer, said first conductor layer and said segment of said second conductor layer;

an insulation gap layer disposed between said first and second magnetic core elements;

bonding means to maintain said first and second magnetic core elements in said Y-shaped configuration around said insulation gap layer; and means to electrically connect said first and second conductor layers of said first and second magnetic core elements to form a signal coil.

7. The magnetic transducer of claim 6 further including preamp means physically secured to said transducer and electrically connected to said signal coil.

8. The magnetic transducer of claim 6 wherein the magnetic material of said pole tip is identical to the magnetic material of said laminated core section and wherein said magnetic material is selected from the group consisting of cobalt-zirconium-niobium alloys, iron-aluminum-silicon alloys and amorphous metals.

9. The magnetic transducer of claim 6 wherein said insulation material is selected from the group consisting of alumina, silicon dioxide, and ceramics.

10. The magnetic transducer of claim 6 wherein said conductor layers are copper.

11. The magnetic transducer of claim 6 wherein the length of the V-shaped top portion of the Y-shaped first and second magnetic core elements is approximately 10% of the overall length of the Y-shaped first and second magnetic core elements.

12. A magnetic transducer for reproducing and/or recording high frequency signals with a magnetic medium comprising:

a pair of opposed transducer head halves separated by an insulation gap layer and bonded together, each transducer head half including:

a generally plate shaped first conductor layer;

a laminated core section of a predetermined width having a surface thereof intimately affixed to said first conductor layer and being formed of a thin insulation layer on said first conductor layer followed by alternate thin layers of magnetic material and insulation material, the composite of said first conductor layer and said laminated core section having a configuration such that when opposed together with another like laminated core section form a generally Y-shaped cross-section;

an insulation layer overlaying the surface and the edges of said laminated core section along with a portion of said first conductor layer adjacent the core section edges;

a second conductor layer on said insulation layer formed as an inverted generally U-shaped member with a bight portion thereof, along with a like bight portion of another transducer half, lying in adjacent relation on opposite sides of said insulation gap layer within a V-shaped opening formed by diverging arms of the Y-shaped cross-section; and a block-shaped magnetic pole tip in magnetic path relation with the distal end of a respective arm of laminated core portion and in proximate relation with said bight portion and extending over said V-shaped portion in a direction generally perpendicular to the plane of said insulation gap layer.

13. The magnetic transducer of claim 12 wherein both inner and outer conductor layers are of a width greater than the width of the laminated core section so that, after bonding the two said halves together, the edges of said first and second conductor layers are accessible, and wherein said transducer further includes means for electrically interconnecting the edges of said first and second conductor layers of both of said halves for forming a signal coil.

14. The magnetic transducer of claim 12 wherein said two adjacent bight portions of said second conductor layers and an intervening portion of said insulation gap layer substantially fill the V-shaped portion.

* * * * *